United States Patent
Ajiro et al.

(10) Patent No.: US 10,711,097 B2
(45) Date of Patent: Jul. 14, 2020

(54) POLYLACTIDE DERIVATIVE, METHOD FOR PRODUCING SAME, AND POLYLACTIDE STEREOCOMPLEX

(71) Applicant: NATIONAL UNIVERSITY CORPORATION NARA INSTITUTE OF SCIENCE AND TECHNOLOGY, Ikoma-shi, Nara (JP)

(72) Inventors: Hiroharu Ajiro, Ikoma (JP); Kai Kan, Nara (JP); Mitsuru Akashi, Suita (JP)

(73) Assignee: NATIONAL UNIVERSITY CORPORATION NARA INSTITUTE OF SCIENCE AND TECHNOLOGY, Nara (JP)

(*) Notice: Subject to any disclaimer, the term of this patent is extended or adjusted under 35 U.S.C. 154(b) by 138 days.

(21) Appl. No.: 15/754,252

(22) PCT Filed: Jul. 14, 2016

(86) PCT No.: PCT/JP2016/070916
§ 371 (c)(1),
(2) Date: Feb. 21, 2018

(87) PCT Pub. No.: WO2017/033613
PCT Pub. Date: Mar. 2, 2017

(65) Prior Publication Data
US 2018/0215867 A1    Aug. 2, 2018

(30) Foreign Application Priority Data

Aug. 21, 2015    (JP) .................................. 2015-164121

(51) Int. Cl.
*C08G 63/82* (2006.01)
*C08G 63/685* (2006.01)
(Continued)

(52) U.S. Cl.
CPC .......... *C08G 63/823* (2013.01); *C08G 63/08* (2013.01); *C08G 63/6852* (2013.01); *C08G 63/912* (2013.01); *C08L 101/16* (2013.01)

(58) Field of Classification Search
None
See application file for complete search history.

(56) References Cited

U.S. PATENT DOCUMENTS 6,509,440 B1    1/2003    Sakane et al.
2003/0187181 A1    10/2003    Sakane et al.
(Continued)

FOREIGN PATENT DOCUMENTS

| BR | PI0512370 A | 3/2008 |
|---|---|---|
| CA | 2 570 822 A1 | 1/2006 |

(Continued)

OTHER PUBLICATIONS

Wang et al (Multifunctional Nanoparticles as Nanocarrier for Vincristine Sulfate Delivery To Overcome Tumor Multidrug Resistance, Mol. Pharmaceutics 2014, 11, 885-894). (Year: 2014).*

(Continued)

*Primary Examiner* — Rachel Kahn
(74) *Attorney, Agent, or Firm* — Oliff PLC

(57) ABSTRACT

A polylactide derivative according to the present invention is expressed by the following general formula (1) or general formula (2):

(Continued)

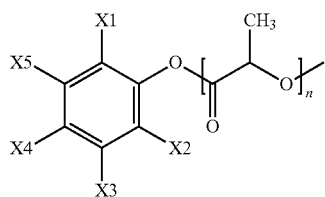

(1)

In general formula (1), one of X1-X5 is an aldehyde group, one of the other four is an alkoxy group, and the other three are hydrogen atoms.

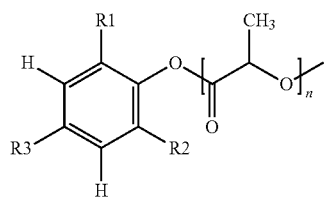

(2)

In general formula (2), one of R1-R3 is selected from a chlorine atom, fluorine atom, aldehyde group, alkoxy group, alkyl group and ester, while the other two are selected from the chlorine atom, fluorine atom, aldehyde group, alkoxy group, alkyl group, ester, and hydrogen atom.

11 Claims, 24 Drawing Sheets

(51) Int. Cl.
*C08G 63/08* (2006.01)
*C08G 63/91* (2006.01)
*C08L 101/16* (2006.01)

(56) References Cited

U.S. PATENT DOCUMENTS

| | | | |
|---|---|---|---|
| 2005/0090401 A1 | 4/2005 | Sakane et al. | |
| 2005/0153149 A1 | 7/2005 | Sakane et al. | |
| 2008/0050603 A1 | 2/2008 | Randall et al. | |
| 2012/0231383 A1* | 9/2012 | Santo | C08G 63/08 430/105 |

FOREIGN PATENT DOCUMENTS

| CN | 101018668 A | 8/2007 |
|---|---|---|
| EP | 1048683 A1 | 11/2000 |
| EP | 1466933 A2 | 10/2004 |
| ES | 2 397 898 T3 | 3/2013 |
| JP | H06-228287 A | 8/1994 |
| JP | 2000-143781 A | 5/2000 |
| JP | 2008-504404 A | 2/2008 |
| JP | 2008-248176 A | 10/2008 |
| JP | 2010-285572 A | 12/2010 |
| JP | 4798800 B2 | 10/2011 |
| JP | 2012-220841 A | 11/2012 |
| KR | 2007-0049140 A | 5/2007 |
| WO | 2000/029460 A1 | 5/2000 |
| WO | 2006/002372 A2 | 1/2006 |
| WO | 2013/108884 A1 | 7/2013 |

OTHER PUBLICATIONS

Slager et al (Biopolymer stereocomplexes, Advanced Drug Delivery Reviews 55 (2003) 549-583). (Year: 2003).*
Aug. 16, 2016 International Search Report issued in International Patent Application No. PCT/JP2016/070916.
Aug. 16, 2016 Written Opinion issued in International Patent Application No. PCT/JP2016/070916.
Hiroharu Ajiro et al; "A stereocomplex of poly(lactide)s with chain end modifcation: simultaneous resistances to melting and thermal decomposition"; ChemComm; 2012; vol. 48; pp. 8478-8480.
Hiroharu Ajiro et al; "Thermally Stabilized Poly(lactide)s Stereocomplex with Bio-Based Aromatic Groups at Both Initiating and Terminating Chain Ends"; Macromolecules; Jun. 25, 2013; vol. 46; pp. 5150-5156.
Feb. 12, 2020 Office Action issued in Japanese Patent Application No. 2017-536677.

* cited by examiner

STRUCTURAL ANALYSIS OF VANILLIN-POLYLACTIC ACID ¹H NMR

PRODUCTION EXAMPLE 1
(PDLA-vanillin1,
MONOMER/INITIATOR=20/1)

STRUCTURAL ANALYSIS OF VANILLIN-POLYLACTIC ACID ¹H NMR

PRODUCTION EXAMPLE 2
(PLLA-vanillin2,
MONOMER/INITIATOR=20/1)

STRUCTURAL ANALYSIS OF VANILLIN-POLYLACTIC ACID $^1$H NMR

PRODUCTION EXAMPLE 3
(PDLA-vanillin3,
MONOMER/INITIATOR=10/1)

STRUCTURAL ANALYSIS OF VANILLIN-POLYLACTIC ACID $^1$H NMR

PRODUCTION EXAMPLE 4
(PLLA-vanillin4,
MONOMER/INITIATOR=10/1)

Imine Compound 1

Imine Compound 1 + HCl

Fig. 10

(a) PLLA-vanillin — Ph-CHO (b) PLLA-vanillin/amine (1/10) — Ph-CH=N- Conv. 98%

(c) (b) +HCl

Fig. 11

Ph-CHO ⬇   Ph-CH=N- ⬆

(a) PDLA-vanillin — Ph-CHO (b) PDLA-vanillin/amine (1/10) — Ph-CH=N- Conv. 98%

(c) (b) +HCl

Polymer (1)

PLLA-vanillin (2)

(1) 100(⇨)-125(➡) nm

Polymer (1)

PLLA-vanillin (2)

~100 nm (a) PLLA-HMF(1)
(Monomer/Initiator=80/1)

(b) PDLA-HMF(2)
(Monomer/Initiator=80/1)

(c) PLLA-HMF(3)
(Monomer/Initiator=20/1)

(d) PDLA-HMF(4)
(Monomer/Initiator=20/1)

a) PLLA-HMF3 b) PDLA-HMF4 ↑ 1755 cm⁻¹ c) SC-HMF  1755 cm⁻¹

1742 cm⁻¹

WAVE NUMBER (cm⁻¹)

a) PLLA-HMF3 b) PDLA-HMF4 c) SC-HMF

2θ (deg)

POLYLACTIDE DERIVATIVE, METHOD FOR PRODUCING SAME, AND POLYLACTIDE STEREOCOMPLEX

TECHNICAL FIELD

The present invention relates to a polylacite derivative and a method for producing the same, as well as a polylactide stereocomplex composed of L- and D-enantiomers of a polylactide derivative.

BACKGROUND ART

Polylactide is a high-molecular compound in which a lactic acid or its derivative obtained from plant-based materials is polymerized by ester linkage. Due to its excellent physical and chemical properties as well as its biological compatibility and biodegradability, polylactide has been drawing attention as a high-molecular compound that is highly safe and causes little burden on living organisms or environments. In particular, polylactide, which is degradable and absorbable in living organisms, is expected to be used as a carrier in a drug delivery system (DDS) or biomedical materials, such as medical adhesives.

As compared to high-molecular petrochemical materials, polylactide has lower levels of thermal resistance and mechanical strength. Accordingly, studies for modifying the thermal resistance and mechanical strength of the polylactide have been conducted.

One of the conventional techniques is the stereocomplexation of the polylactide. A stereocomplex is a crystal structure which is formed by mixing L- and D-enantiomers and has the L- and D-enantiomers alternately and regularly arranged. A substance having such a crystal structure is also called the stereocomplex. In general, a stereocomplex has a higher melting point than the homocrystal of its constituents (L- or D-enantiomer) and has the potential to be a high-molecular material with high thermal resistance. Accordingly, the idea of mixing the enantiomers of the polylactide, i.e. poly-L-lactic acid and poly-D-lactic acid, to form a stereocomplex crystal and use it as a high-polymer material has been proposed (for example, see Patent Literature 1 or 2).

Another conventional method for modifying the nature of the polylactide is to introduce a substituent group at a terminal of the polylactide. For example, Non Patent Literatures 1 and 2 disclose poly-L-lactic-acid and poly-D-lactic-acid derivatives in which a caffeic acid derivative is chemically bonded to one terminal of the poly-L-lactic acid as well as one terminal of the poly-D-lactic acid. A stereocomplex composed of such poly-L-lactic-acid and poly-D-lactic-acid derivatives has higher pyrolysis temperatures, i.e. T10 (the temperature at which a 10-wt % decrease in weight is observed) and Tm (melting point), than its homocrystal. Thus, the thermal resistance has been improved.

CITATION LIST

Patent Literature

Patent Literature 1: JPWO 2013/108884 A
Patent Literature 2: JP 2008-248176 A

Non Patent Literature

Non Patent Literature 1: H. Ajiro, et al., *Chem. Commun.* 2012, 48, 8478-8480

Non Patent Literature 2: H. Ajiro, et al., *Macromolecules* 2013, 46, 5150-5156

SUMMARY OF INVENTION

Technical Problem

As noted earlier, polylactide is expected to be used as biomedical materials. Biomedical materials are required to have specific natures: e.g. they should have the capability to reversibly bond to various substances in living organisms or selectively react with those substances, and they should also allow for an easy adjustment of the decomposition rate in living organisms or degree of affinity to drugs. However, most of the previous studies have been focused on the stereocomplexation or similar techniques for improving the mechanical strength and thermal resistance of the polylactide; other natures of the substance have not been sufficiently researched.

The problem to be solved by the present invention is to modify not only the mechanical strength and thermal resistance of the polylactide but also other physical and/or chemical natures of the same substance.

Solution to Problem

Polylactide has no highly reactive functional group. This makes it difficult to modify the physical or chemical natures of the polylactide. Paying attention to this fact, the present inventors have conceived the idea of introducing a reactive substituent group into the polylactide.

In the case where a reactive substituent group is introduced into a high-molecular compound like the polylactide, the reactive substituent group will easily react with various substances if it is located at a terminal of the compound. Accordingly, the present inventors have conceived the idea of introducing a reactive substituent group at a terminal of the polylactide by generating a polylactide derivative using, as the initiator, a compound which will eventually become the reactive substituent group.

For this purpose, the present inventors have searched for compounds which can be reactive substituent groups among the substances which originate from plant-based materials as with the polylactide. Consequently, vanillin and hydroxymethylfurfural (HMF) have been found, both of which have an aldehyde group which is highly reactive. By using one of these compounds as the initiator for generating a polylactide derivative, a reactive substituent group having the aldehyde group can be introduced at one terminal of the polylactide. The aldehyde group is known as a functional group that is highly reactive with proteins, amino acids, polysaccharides or similar substances which are present in living organisms. Vanillin is a compound contained in vanilla, which is an orchidaceous plant. HMF is produced by a pyrolysis of sugar or carbohydrates. Thus, both vanillin and HMF can be obtained from plant-based materials.

With reference to the structures of vanillin and HMF, the present inventors further continued the search for a compound that has the potential to be an initiator, and obtained polylactide derivatives, as will be hereinafter described.

That is to say, a polylactide derivative according to the present invention developed for solving the previously described problem is characterized by being expressed by the following general formula (1):

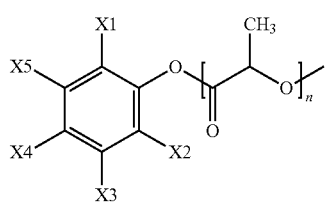

(1)

where one of X1-X5 is an aldehyde group, one of the other four is an alkoxy group, and the other three are hydrogen atoms.

Another polylactide derivative according to the present invention is characterized by being expressed by the following general formula (2):

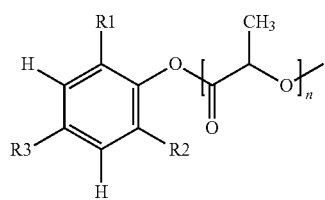

(2)

where one of R1-R3 is selected from the chlorine atom, fluorine atom, aldehyde group, alkoxy group, alkyl group and ester, while the other two are selected from the chlorine atom, fluorine atom, aldehyde group, alkoxy group, alkyl group, ester, and hydrogen atom.

The polylactide derivative expressed by general formula (1) is obtained by ring-opening polymerization of lactide as the monomer, using a compound expressed by the following general formula (7) as the initiator, and has an aldehyde group which is a reactive functional group.

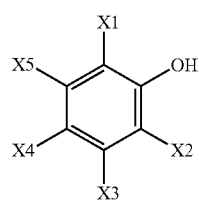

(7)

The polylactide derivative expressed by general formula (2) can be obtained by ring-opening polymerization of lactide as the monomer, using a compound expressed by the following general formula (8) as the initiator. This compound includes a chlorine atom, fluorine atom, aldehyde group, alkoxy group, alkyl group, ester group, or the like as a highly reactive functional group or characteristic group.

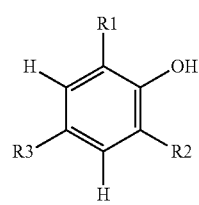

(8)

Among the polylactide derivatives expressed by general formula (2), the polylactide derivative in which R1 is a methoxy group, R2 is a hydrogen atom, and R3 is an aldehyde group is expressed by the following formula (3). This derivative is obtained by ring-opening polymerization of lactide as the monomer, using vanillin as the initiator.

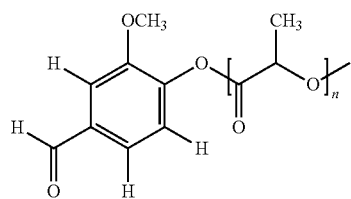

(3)

Another polylactide derivative according to the present invention is characterized by being expressed by the following general formula (4):

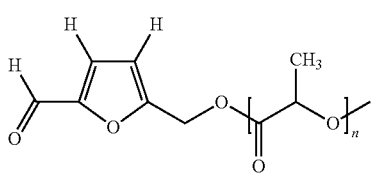

(4)

The polylactide derivative expressed by formula (4) is obtained by ring-opening polymerization of lactide as the monomer, using a compound expressed by the following formula (10), i.e. HMF, as the initiator.

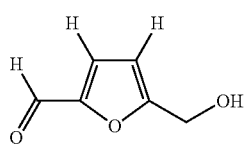

(10)

Not all kinds of initiators used for obtaining the polylactide derivatives expressed by general formulae (1) and (2) can be obtained from materials of natural origins. However, depending on the purpose of the use of the high-polymer material, an initiator which has not been obtained from a material of natural origin (i.e. which has been obtained from a material of petroleum origin) may be used without causing any problem.

Another aspect of the present invention developed for solving the previously described problem provides a polylactide stereocomplex.

More specifically, a polylactide stereocomplex according to the present invention contains L- and D-enantiomers of a polylactide derivative expressed by general formula (1).

Another polylactide stereocomplex according to the present invention contains L- and D-enantiomers of a polylactide derivative expressed by general formula (2).

Still another polylactide stereocomplex according to the present invention contains L- and D-enantiomers of a polylactide derivative expressed by formula (3), or L- and D-enantiomers of a polylactide derivative expressed by formula (4).

The polylactide stereocomplex according to the present invention has a reactive substituent group introduced at one terminal of each of the L- and D-enantiomers of the polylactide forming the stereocomplex. Therefore, it has higher levels of mechanical strength and thermal resistance than the polylactide while allowing for a modification of its physical and chemical natures.

Advantageous Effects of the Invention

A polylactide derivative according to the present invention has a reactive substitute group introduced at one terminal of the polylactide. This allows for a modification of the physical and chemical natures of the polylactide. A polylactide stereocomplex composed of D- and L-enantiomers of such a polylactide derivative has a high melting point and high pyrolysis temperature, thus being highly resistant to heat.

In particular, a polylactide derivative in which a reactive substitute group with an aldehyde group is introduced, or a polylactide stereocomplex composed of D- and L-enantiomers of such a polylactide derivative, can selectively react with or reversibly bond to proteins or amino acids as well as polysaccharides forming cell walls. Such a substance is useful as a biomedical material with excellent functionality and biological compatibility. Furthermore, a polylactide derivative or polylactide stereocomplex usable as a highly safe biodegradable material can be provided by using vanillin or hydroxymethylfurfural (HMF), both of which can be obtained from plant-based materials, as the reactive substituent group having an aldehyde group to be introduced at one terminal of the polylactide.

BRIEF DESCRIPTION OF DRAWINGS

FIG. 10 is a set of $^1$H NMR spectra showing the reversibility of the reaction between the aldehyde group at a terminal of the vanillin-polylactide according to Production Example 2 in the first embodiment and the primary amine.

FIG. 11 is a series of $^1$H NMR spectra showing the result of an experiment on the reactivity between the aldehyde group at a terminal of a vanillin-polylactide according to Production Example 6 in the first embodiment and the primary amine, the experiment performed under the condition that the ratio of vanillin and amino group was 1:10.

FIG. 12 is a set of $^1$H NMR spectra showing the reversibility of the reaction between the aldehyde group at a terminal of the vanillin-polylactide according to Production Example 6 in the first embodiment and the primary amine.

FIG. 14A is the reversible reaction formula, FIG. 14B is a photograph showing the result of an experiment for determining whether or not the Tyndall phenomenon has occurred, FIG. 14C is the result of a particle-size measurement by dynamic light scattering (DLS), FIG. 14D is a photograph showing a difference in contact angle, and FIG. 14E is a bar chart showing a measured result of the contact angle.

DESCRIPTION OF EMBODIMENTS

Figure 1:
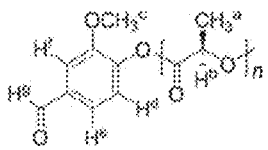
FIG. 1 is a $^1$H NMR spectrum of a polylactide derivative according to Production Example 1 in the first embodiment.
Figure 1:
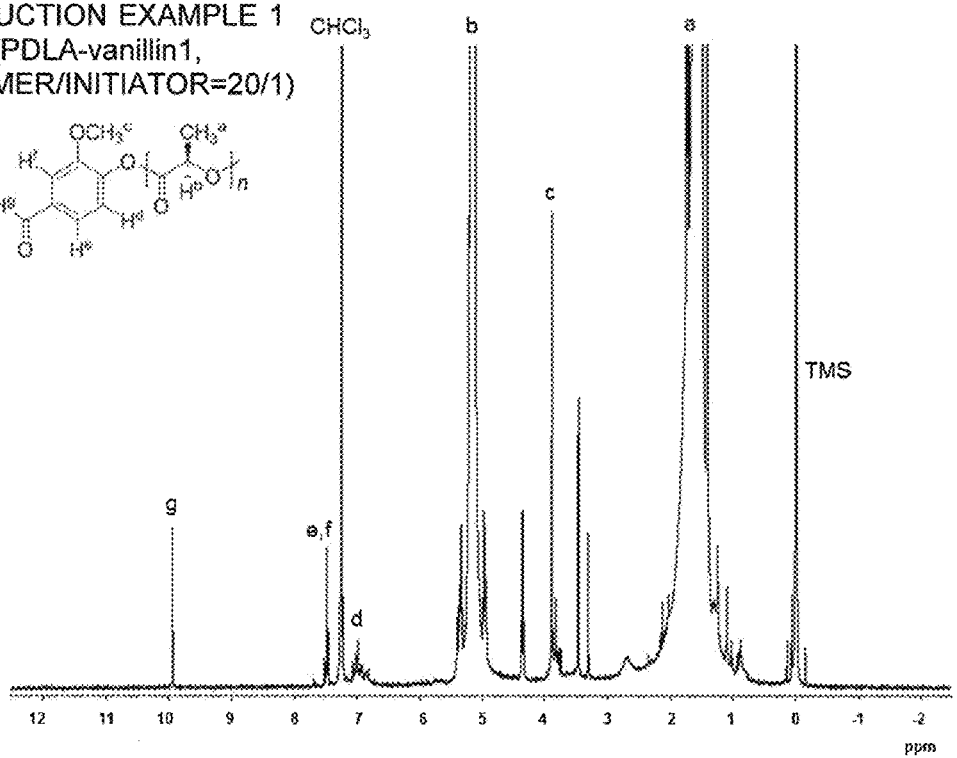
Figure 2:
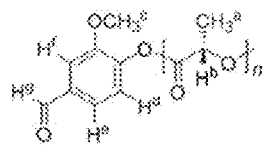
FIG. 2 is a $^1$H NMR spectrum of a polylactide derivative according to Production Example 2 in the first embodiment.
Figure 2:
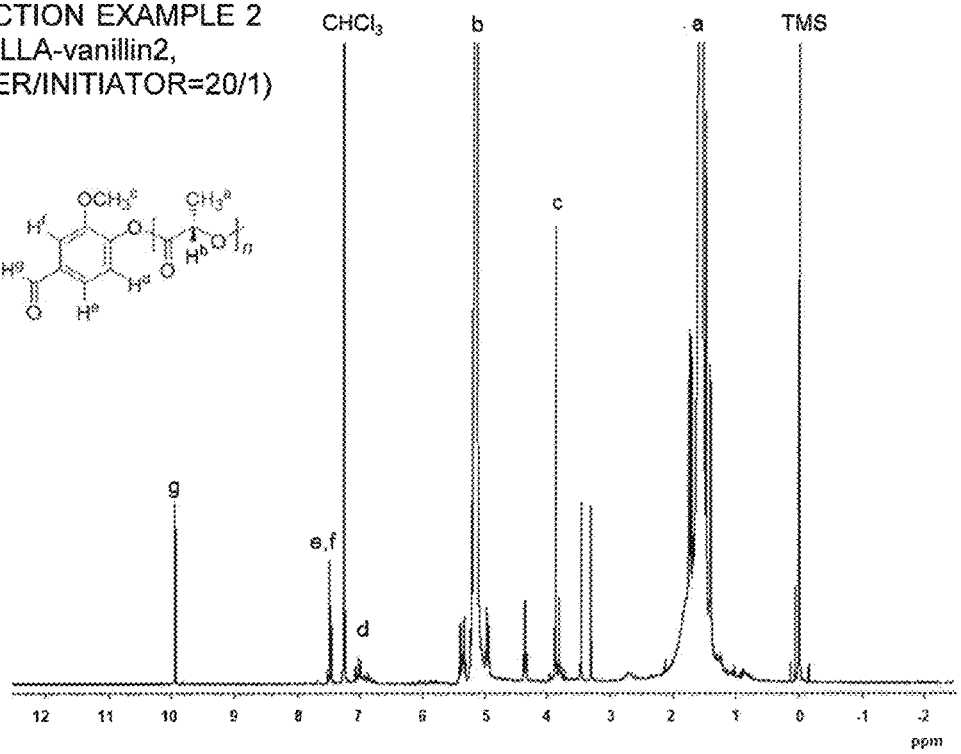
Figure 3:
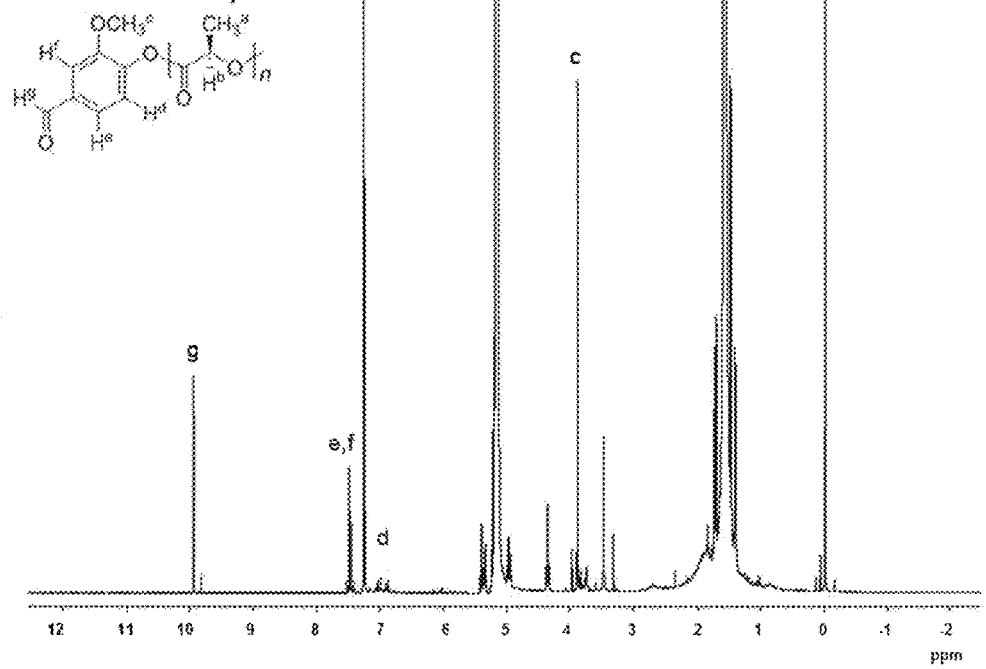
FIG. 3 is a $^1$H NMR spectrum of a polylactide derivative according to Production Example 3 in the first embodiment.
Figure 4:
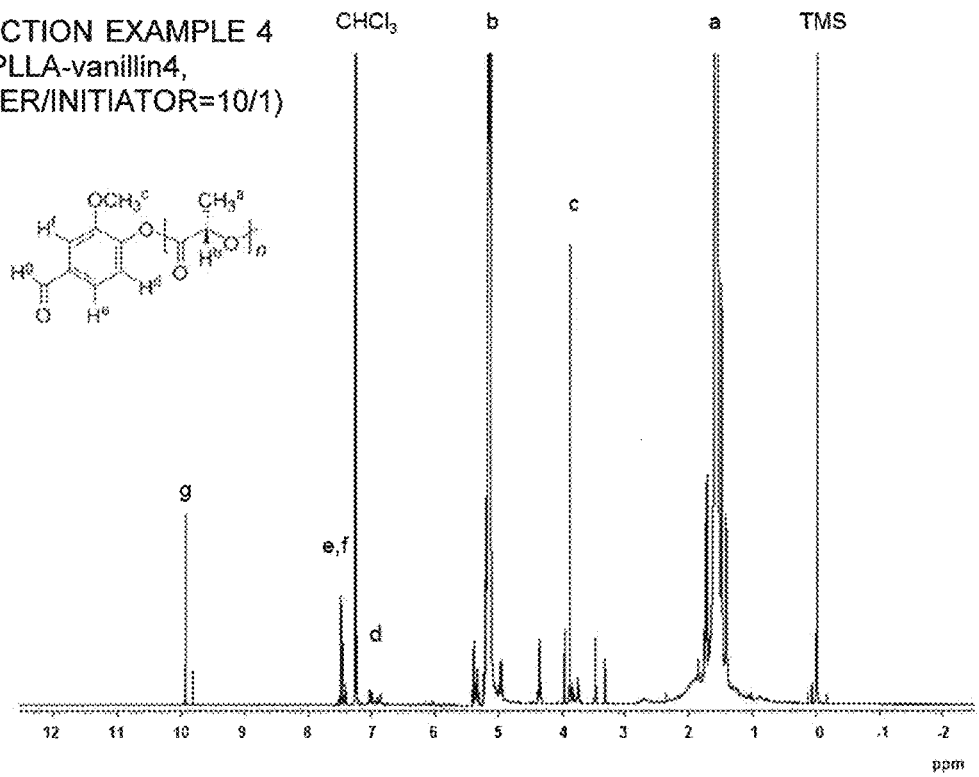
FIG. 4 is a $^1$H NMR spectrum of a polylactide derivative according to Production Example 4 in the first embodiment.

The polylactide derivative and polylactide stereocomplex according to the present invention will be hereinafter specifically described by production examples and experimental examples. It should be noted that the scope of the present invention is not limited to the following production and experimental examples.

First Embodiment: Polylactide Derivatives

Polylactide derivatives according to the first aspect of the present invention are expressed by the following general formula (1) or (2):

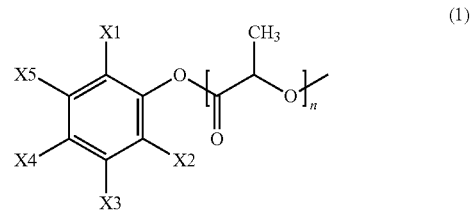

(1)

In general formula (1), one of X1-X5 is an aldehyde group, one of the other four is an alkoxy group, and the other three are hydrogen atoms.

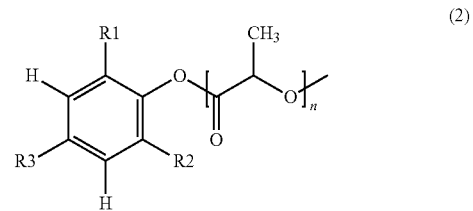

(2)

In general formula (2), one of R1-R3 is selected from the chlorine atom, fluorine atom, aldehyde group, alkoxy group, alkyl group and ester, while the other two are selected from the chlorine atom, fluorine atom, aldehyde group, alkoxy group, alkyl group, ester, and hydrogen atom. In particular, it is preferable that at least R3 be selected from the chlorine atom, fluorine atom, aldehyde group, alkoxy group, alkyl group and ester.

Among the polylactide derivatives expressed by general formula (1), those which have a methoxy group as X1, aldehyde group as X4 and hydrogen atoms as X2, X3 and X5 are expressed by the following formula (3). Similarly, among the polylactide derivatives expressed by general formula (2), those which have a methoxy group as R1, hydrogen atom as R2 and aldehyde group as R3 are also expressed by formula (3). Specific production examples of the polylactide derivatives expressed by this formula (which may be hereinafter called the "vanillin-polylactides") will be hereinafter presented.

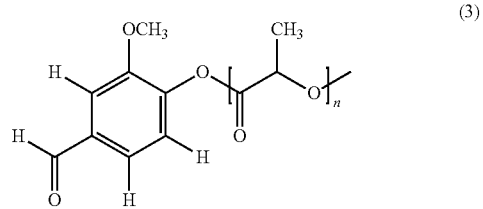

(3)

<1. Synthesis of Vanillin-Polylactide>

Vanillin is known as a compound contained in vanilla, which is an orchidaceous plant. It is expressed by the following formula (9).

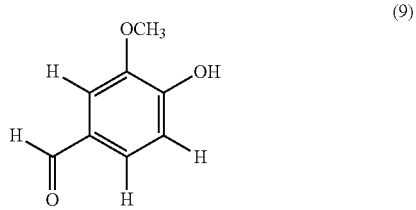 [SMILES: COc1cc(C=O)ccc1O]

(9)

Polylactide is a high-polymer compound in which an L- or D-lactic acid expressed by the following formula (14) or their derivative is polymerized by ester linkage:

(14)

Polylactide stereocomplex (which will be described later) is composed of a poly-L-lactic acid in which only the L-lactic acid is polymerized and a poly-D-lactic acid in which only the D-lactic acid is polymerized.

Production Example 1

Using (D,D)-lactide as the monomer (M) and vanillin as the initiator (I), 0.5 g of (D,D)-lactide and a required amount of vanillin (I) were introduced into an ampule tube so that the molar ratio (M/I) of the monomer (M) and initiator (I) would be 20/1. Then, the gas inside the tube was replaced by nitrogen. Subsequently, 1.1 mL of toluene solution of Tin(II) 2-ethylhexanoate or Tin(II) octoate (which is hereinafter abbreviated as "Sn(Oct)$_2$") prepared at a concentration of 1 mol % was added, and the tube was heated in an oil bath at a temperature of 120° C. for two hours to promote the polymerization of (D,D)-lactide. The obtained reaction mixture was dissolved in 10 mL of chloroform, which was subsequently put in 200 mL of methanol, and the reprecipitated methanol-insoluble part was collected. The yield was 85%. The methanol-insoluble part obtained in Production Example 1 may be hereinafter called the "PDLA-vanillin 1".

Production Example 2

Using (L,L)-lactide as the monomer (M) and vanillin as the initiator (I), 0.5 g of (L,L)-lactide and a required amount of vanillin were introduced into an ampule tube so that the molar ratio (M/I) of the monomer (M) and initiator (I) would be 20/1. Then, the gas inside the tube was replaced by nitrogen. Subsequently, 1.1 mL of toluene solution of Sn(Oct)$_2$ prepared at a concentration of 1 mol % was added, and the tube was heated in an oil bath at a temperature of 120° C. for two hours to promote the polymerization of (L,L)-lactide. The obtained reaction mixture was dissolved in 10 mL of chloroform, which was subsequently put in 200 mL of methanol and the reprecipitated methanol-insoluble part was collected. The yield was 88%. The methanol-insoluble part obtained in Production Example 2 may be hereinafter called the "PLLA-vanillin 2".

Production Example 3

Using (D,D)-lactide as the monomer (M) and vanillin as the initiator (I), 1 g of (D,D)-lactide and a required amount of vanillin were introduced into an ampule tube so that the molar ratio (M/I) of the monomer (M) and initiator (I) would be 10/1. Then, the gas inside the tube was replaced by nitrogen. Subsequently, 4.4 mL of toluene solution of Sn(Oct)$_2$ prepared at a concentration of 1 mol % was added, and the tube was heated in an oil bath at a temperature of 120° C. for two hours to promote the polymerization of (D,D)-lactide. The obtained reaction mixture was dissolved in 10 mL of chloroform, which was subsequently put in 200 mL of methanol and the reprecipitated methanol-insoluble part was collected. The yield was 85%. The methanol-insoluble part obtained in Production Example 3 may be hereinafter called the "PDLA-vanillin 3".

Production Example 4

Using (L,L)-lactide as the monomer (M) and vanillin as the initiator (I), 1 g of (L,L)-lactide and a required amount of vanillin were introduced into an ampule tube so that the molar ratio (M/I) of the monomer (M) and initiator (I) would be 10/1. Then, the gas inside the tube was replaced by nitrogen. Subsequently, 4.4 mL of toluene solution of Sn(Oct)$_2$ prepared at a concentration of 1 mol % was added, and the tube was heated in an oil bath at a temperature of 120° C. for two hours to promote the polymerization of (L,L)-lactide. The obtained reaction mixture was dissolved in 10 mL of chloroform, which was subsequently put in 200 mL of methanol and the reprecipitated methanol-insoluble part was collected. The yield was 85%. The methanol-insoluble part obtained in Production Example 4 may be hereinafter called the "PLLA-vanillin 4".

Production Example 5

As Production Example 5, a polylactide which contains both L- and D-lactic acids was synthesized, and vanillin was introduced at a terminal of the synthesized compound. Specifically, using (L,L)-lactide and (D,D)-lactide as the monomers (M1, M2) and vanillin as the initiator (I), 0.5 g of (L,L)-lactide and 0.5 g of (D,D)-lactide as well as a required amount of vanillin (I) were introduced into an ampule tube so that the molar ratio (M1/M2/I) of the monomers (M1, M2) and initiator (I) would be 10/10/1. Then, the gas inside the tube was replaced by nitrogen. Subsequently, 2.2 mL of toluene solution of Sn(Oct)$_2$ prepared at a concentration of 1 mol % was added, and the tube was heated in an oil bath at a temperature of 120° C. for two hours to promote the polymerization of (L,L)-lactide as well as that of (D,D)-lactide. The reaction mixture was dissolved in 10 mL of chloroform, which was subsequently put in 200 mL of methanol, and the reprecipitated methanol-insoluble part was collected. The yield was 87%. The methanol-insoluble part obtained in Production Example 5 may be hereinafter called the "PDLLA-vanillin 5".

Production Example 6

The methanol-insoluble part was collected under the same conditions and through the same procedure as described in Production Example 1. The yield was 88%. The methanol-insoluble part obtained in Production Example 6 may be hereinafter called the "PLLA-vanillin 6".

Production Example 7

The methanol-insoluble part was collected under the same conditions and through the same procedure as described in Production Example 2. The yield was 89%. The methanol-insoluble part obtained in Production Example 7 may be hereinafter called the "PDLA-vanillin 7".

<2. Analysis of Vanillin-Polylactides>

A molecular-weight analysis of the methanol-insoluble parts obtained in Production Examples 1-7 was performed. The number-average molecular weight (Mn), weight-average molecular weight (Mw) and molecular-weight distribution (PDI=Mw/Mn) were determined from the results of gel penetration chromatography (GPC) using a standard solution of polystyrene tetrahydrofuran. Table 1 shows the results. In Table 1, the molecular weights and PDI with superscript "a" are the results obtained by the analysis in UV mode, while those with superscript "b" are the results obtained by the analysis in RI mode.

TABLE 1

| No. | Sample ID | Monomer Initiator | Yield (%) | Mn ($\times 10^3$)[a] | Mw ($\times 10^3$)[a] | PDI[a] | Mn ($\times 10^3$)[b] | Mw ($\times 10^3$)[b] | PDI[b] | $[\alpha]_D$ (°) |
|---|---|---|---|---|---|---|---|---|---|---|
| 1 | PDLA-vanillin1 | 20/1 | 85 | 10.6 | 24.1 | 2.27 | 8.7 | 18.1 | 2.08 | 148 ± 1 (27° C.) |
| 2 | PLLA-vanillin2 | 20/1 | 88 | 8.8 | 19.5 | 2.26 | 8.1 | 18.1 | 2.24 | −155 ± 1 (27° C.) |
| 3 | PDLA-vanillin3 | 10/1 | 85 | 8.8 | 15.9 | 1.8 | 11.3 | 21.1 | 1.86 | 157 ± 1 (29° C.) |
| 4 | PLLA-vanillin4 | 10/1 | 85 | 9.4 | 16.5 | 1.75 | 12.6 | 22.1 | 1.75 | −157 ± 8 (29° C.) |
| 5 | PDLLA-vanillin5 | 10/10/1 | 87 | 14.9 | 27.1 | 1.82 | 14.9 | 21 | 1.89 | −0.8 ± 0.4 (31° C.) |
| 6 | PDLA-vanillin6 | 20/1 | 88 | 9.3 | 20.7 | 2.23 | 16.8 | 32.9 | 1.95 | 165 ± 1 (29° C.) |
| 7 | PLLA-vanillin7 | 20/1 | 89 | 8.8 | 16.6 | 1.9 | 11.4 | 22.5 | 1.97 | −137 ± 1 (30° C.) |

A structural analysis of the methanol-insoluble parts obtained in Production Examples 1-4 was also performed based on their proton NMR spectra. FIGS. 1-4 show the results. The results shown in Table 1 as well as FIGS. 1-4 confirmed that a polylactide was formed by the following reaction in any of the Production Examples 1-4, with vanillin introduced at a terminal of the polylactide. The polylactide obtained in each of those Production Examples is hereinafter called the "vanillin-polylactide".

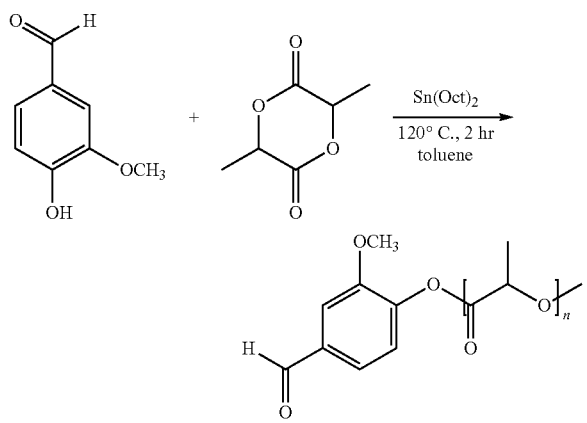

<3. Reversible Reaction Between Terminal of Polylactide and Primary Amine>

Experimental Example 1

Figure 5A:
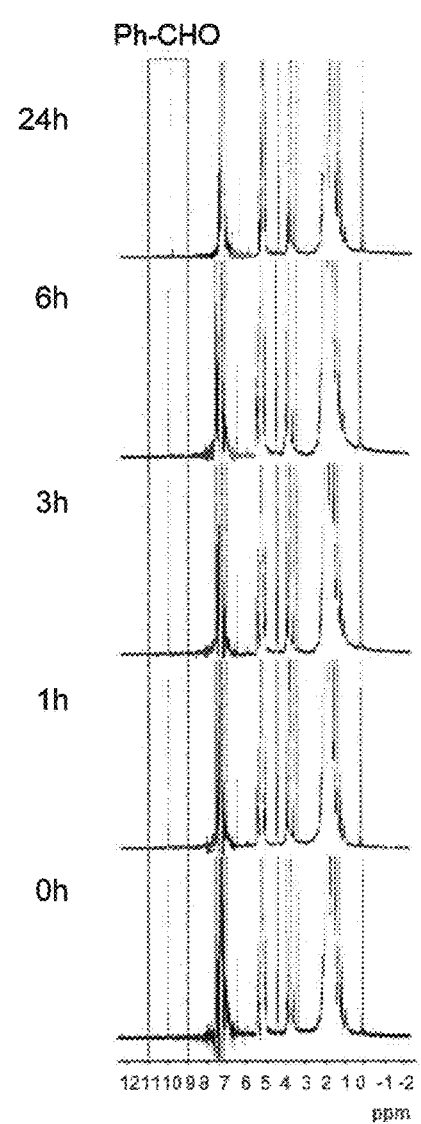
FIG. 5A is a series of $^1$H NMR spectra showing the result of an experiment on the reactivity between the aldehyde group at a terminal of a polylactide derivative ("vanillin-polylactide") according to Production Example 1 in the first embodiment and the primary amine, the experiment performed under the condition that the ratio of vanillin and amino group was 1:1.
Figure 5B:
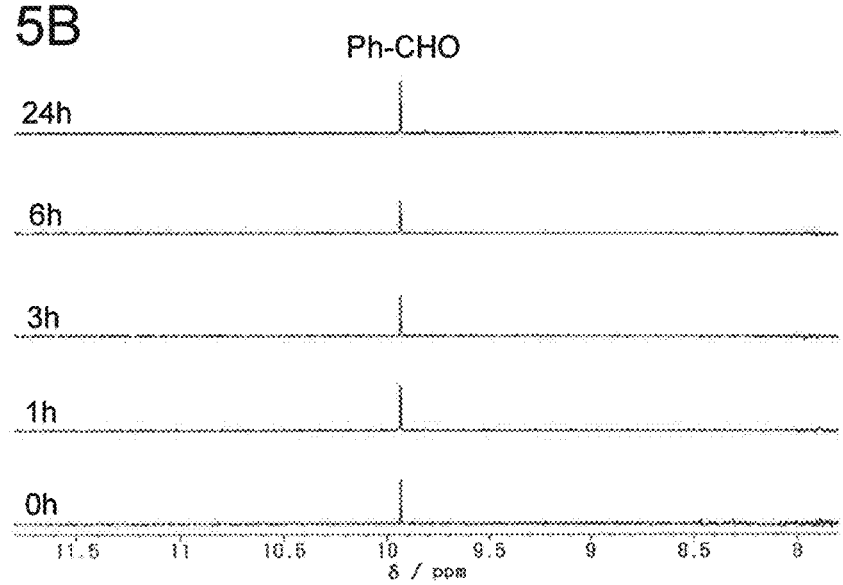
FIG. 5B is an enlarged view of FIG. 5A.

In order to confirm the reactivity of the aldehyde group of vanillin introduced at a terminal of the polylactide, 30 mg of vanillin-polylactide in Production Example 1 (PDLA-vanillin 1) was dissolved in 0.647 mL of chloroform-d, and 0.153 mL of a solution prepared by diluting 0.04 mL of 2-(2-aminoethoxy) ethanol with 100 mL of chloroform was dropped into the chloroform-d solution. These values satisfy the condition that the ratio of the vanillin at the terminal and the amino group should be 1:1. FIGS. 5A and 5B as well as Table 2 show the results of a measurement in which the proton NMR spectrum was observed for 24 hours from directly after the mixing.

TABLE 2

| No. | Reaction time (h) | Aldehyde[a] (—CHO) | Imine[a] (—CH=N—) | Conversion (%) |
|---|---|---|---|---|
| 1 | 0 | 1 | 0 | 0 |
| 2 | 1 | 1 | 0 | 0 |
| 3 | 3 | 1 | 0 | 0 |
| 4 | 6 | 1 | 0 | 0 |
| 5 | 24 | 1 | 0 | 0 |

Figure 6A:
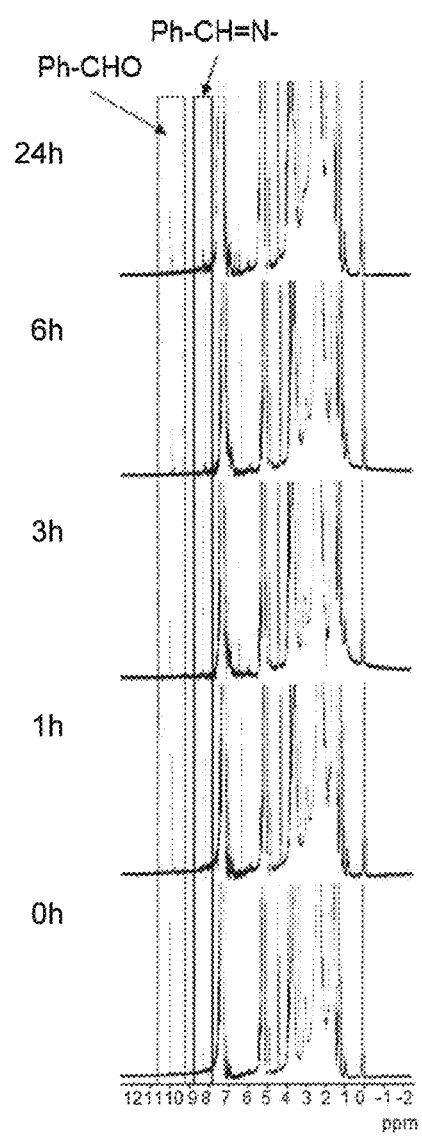
FIG. 6A is a series of $^1$H NMR spectra showing the result of an experiment on the reactivity between the aldehyde group at a terminal of the vanillin-polylactide according to Production Example 1 in the first embodiment and the primary amine, the experiment performed under the condition that the ratio of vanillin and amino group was 1:10.
Figure 6B:
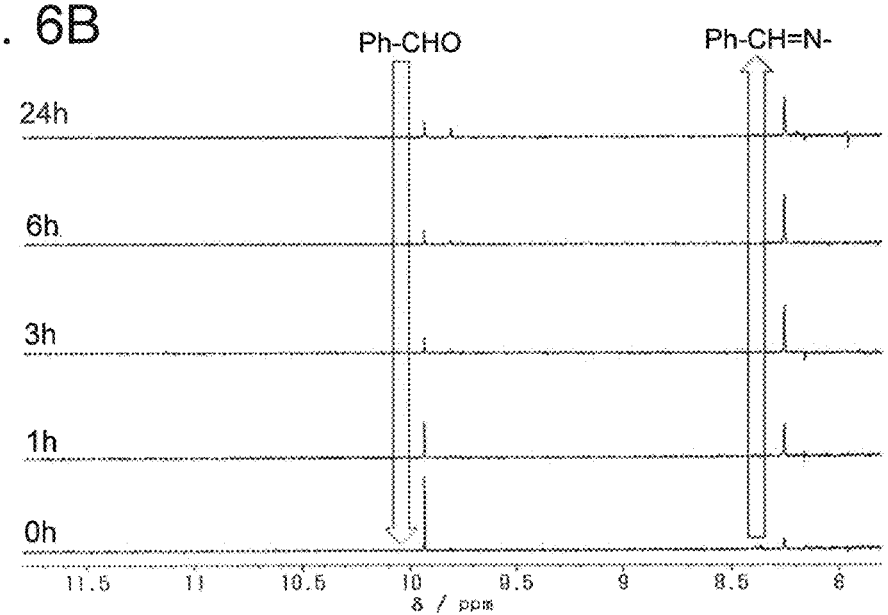
FIG. 6B is an enlarged view of FIG. 6A.

Similarly, 30 mg of vanillin-polylactide (PDLA-vanillin 1) was dissolved in 0.647 mL of chloroform-d, and 0.153 mL of a solution prepared by diluting 0.4 mL of 2-(2-aminoethoxy) ethanol with 100 mL of chloroform was dropped into the chloroform-d solution. These values satisfy the condition that the ratio of the vanillin at the terminal and the amino group should be 1:10. FIGS. 6A and 6B as well as Table 3 show the results of a measurement in which the proton NMR spectrum was observed for 24 hours from directly after the mixing.

TABLE 3

| No. | Reaction time (h) | Aldehyde[a] (—CHO) | Imine[a] (—CH=N—) | Conversion (%) |
|---|---|---|---|---|
| 1 | 0 | 3.71 | 1 | 21 |
| 2 | 1 | 0.65 | 1 | 61 |
| 3 | 3 | 0.17 | 1 | 85 |
| 4 | 6 | 0.18 | 1 | 85 |
| 5 | 24 | 0.17 | 1 | 85 |

As shown in FIGS. 5A and 5B as well as Table 2, under the condition that the ratio of vanillin/amino group was 1/1, no change was observed even after the passage of a long period of time from the mixing. A possible reason for this result is that the concentration of 2-(2-aminoethoxy) ethanol (or amino group) was too low. By comparison, as shown in FIGS. 6A and 6B as well as Table 3, under the condition that the ratio of vanillin/amino group was 1/10, imine was formed with the passage of time after the mixing. A formula of the reaction between the vanillin-polylactide and 2-(2-aminoethoxy) ethanol is as follows:

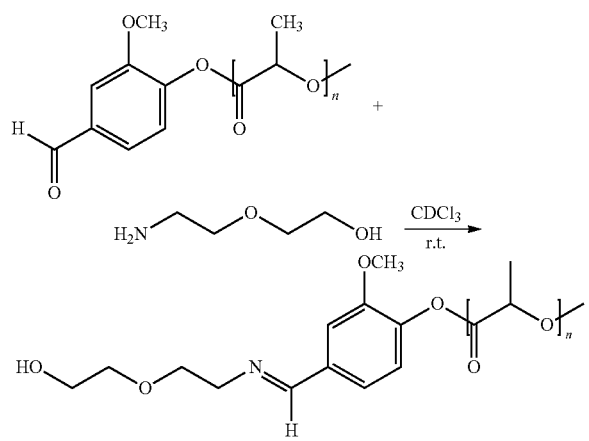

Experimental Example 2

Figure 7A:
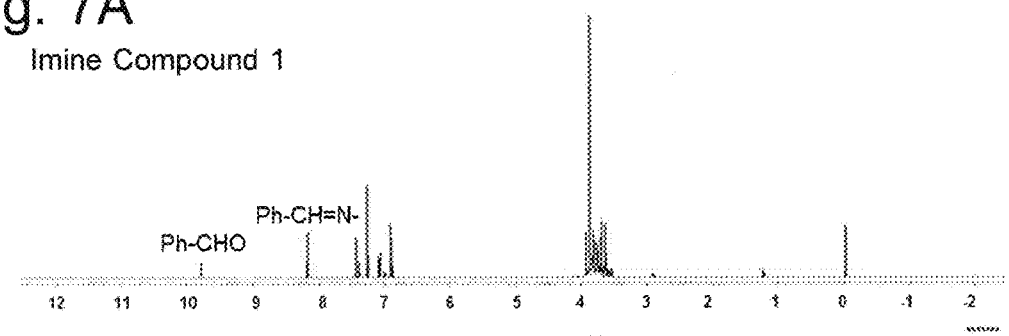
FIG. 7A is a $^1$H NMR spectrum of a mixture of vanillin and 2-(2-aminoethoxy) ethanol (this mixture is hereinafter called "Imine Compound 1")
Figure 7B:
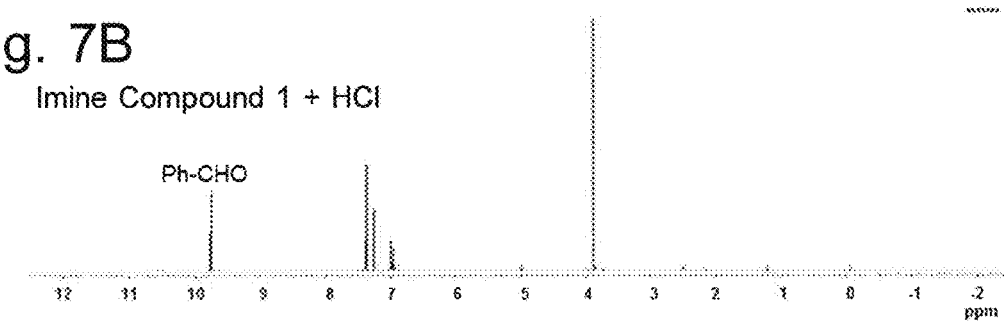
FIG. 7B is a $^1$H NMR spectrum of a compound (vanillin) obtained by adding hydrochloric acid to Imine Compound 1.

Vanillin and 2-(2-aminoethoxy) ethanol was mixed together using chloroform as the solvent, and a structural analysis ($^1$H NMR) of the mixture was performed. FIG. 7A shows the obtained result. This result suggested that the aldehyde group of vanillin reacted with the amino group of 2-(2-aminoethoxy) ethanol to form Imine Compound 1. Subsequently, a structural analysis ($^1$H NMR) was performed for a mixture of vanillin and 2-(2-aminoethoxy) ethanol with hydrochloric acid added. FIG. 7B shows the obtained result. This result suggested that the reaction between (the aldehyde group of) vanillin and (the amino group of) 2-(2-aminoethoxy) ethanol is reversible, as expressed by the following reaction formula.

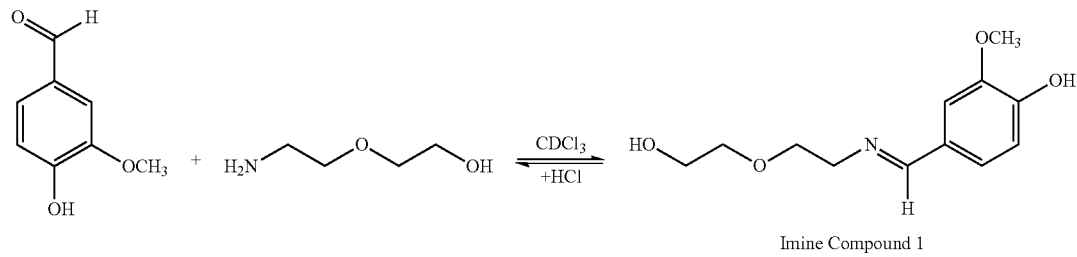

Imine Compound 1

That is to say, under the presence of chloroform, vanillin reacts with 2-(2-aminoethoxy) ethanol to form Imine Compound 1, and Imine Compound 1 is decomposed into vanillin and 2-(2-aminoethoxy) ethanol when hydrochloric acid is added to it. Accordingly, the aforementioned results suggest that the aldehyde group introduced at a terminal of the vanillin-polylactide reacts with a compound containing an amino group to form an imine, and this reaction is reversible.

Experimental Example 3

Figure 8:
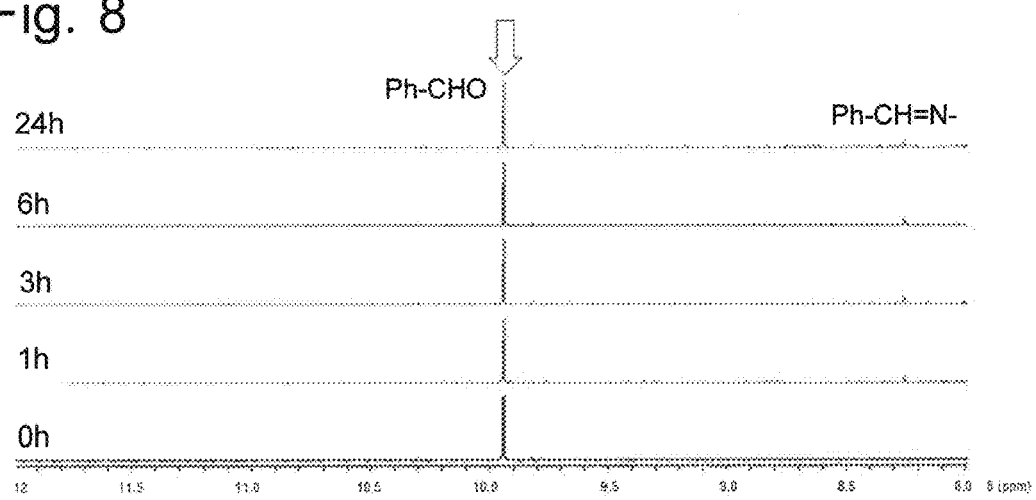
FIG. 8 is a series of $^1$H NMR spectra showing the result of an experiment on the reactivity between the aldehyde group at a terminal of a vanillin-polylactide according to Production Example 2 in the first embodiment and the primary amine, the experiment performed under the condition that the ratio of vanillin and amino group was 1:1.

Initially, 30 mg of vanillin-polylactide in Production Example 2 (PLLA-vanillin 2) was dissolved in 0.692 mL of chloroform-d, and 0.108 mL of a solution prepared by diluting 0.02 mL of 2-(2-aminoethoxy) ethanol with 20 mL of chloroform was dropped into the chloroform-d solution. These values satisfy the condition that the ratio of the vanillin at the terminal and the amino group should be 1:1. FIG. 8 and Table 2 show the results of a measurement in which the proton NMR spectrum was observed for 24 hours from directly after the mixing.

TABLE 4

| No. | Reaction time (h) | Aldehyde $^a$ (—CHO) | Imine $^a$ (—CH=N—) | Conversion (%) |
|---|---|---|---|---|
| 1 | 0 | 1 | 0 | 0 |
| 2 | 1 | 5.24 | 1 | 16 |
| 3 | 3 | 4.22 | 1 | 19 |
| 4 | 6 | 4.17 | 1 | 19 |
| 5 | 24 | 4.71 | 1 | 18 |

As is evident from FIG. 8 and Table 4, an extremely low peak of imine was observed at 1 hour from the beginning of the mixing. However, no more change in the imine peak occurred until the end of the 24-hour period.

Figure 9:
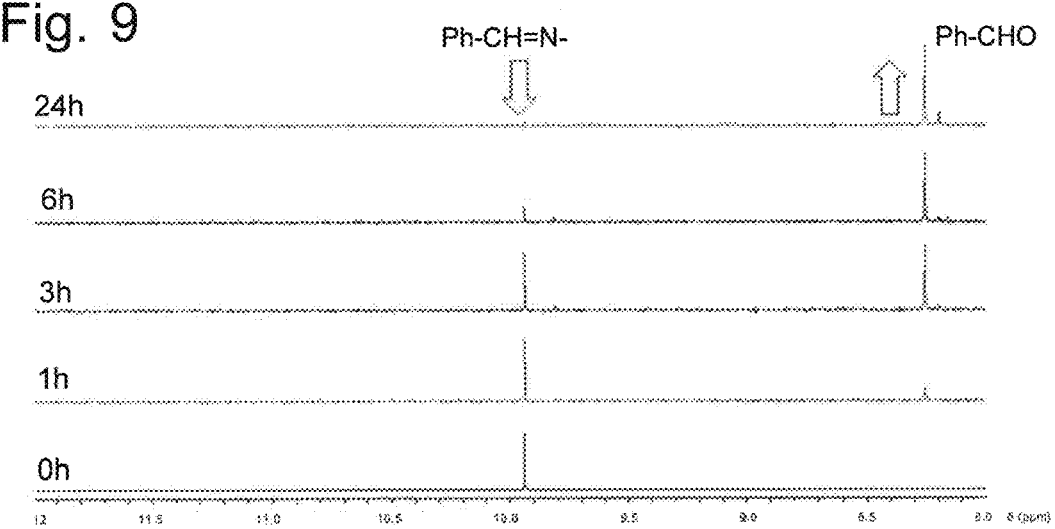
FIG. 9 is a series of $^1$H NMR spectra showing the result of an experiment on the reactivity between the aldehyde group at a terminal of the vanillin-polylactide according to Production Example 2 in the first embodiment and the primary amine, the experiment performed under the condition that the ratio of vanillin and amino group was 1:10.

Similarly, 30 mg of vanillin-polylactide (PLLA-vanillin 1) in Production Example 2 was dissolved in 0.692 mL of chloroform-d, and 0.108 mL of a solution prepared by diluting 0.2 mL of 2-(2-aminoethoxy) ethanol with 20 mL of chloroform was dropped into the chloroform-d solution. These values satisfy the condition that the ratio of the vanillin at the terminal and the amino group should be 1:10. FIG. 9 and Table 5 show the results of a measurement in which the proton NMR spectrum was observed for 24 hours from directly after the mixing.

TABLE 5

| No. | Reaction time (h) | Aldehyde $^a$ (—CHO) | Imine $^a$ (—CH=N—) | Conversion (%) |
|---|---|---|---|---|
| 1 | 0 | 1 | 0 | 0 |
| 2 | 1 | 2.4 | 1 | 29 |

TABLE 5-continued

| No. | Reaction time (h) | Aldehyde[a] (—CHO) | Imine[a] (—CH=N—) | Conversion (%) |
|---|---|---|---|---|
| 3 | 3 | 0.46 | 1 | 68 |
| 4 | 6 | 0.11 | 1 | 90 |
| 5 | 24 | 0.017 | 1 | 98 |

As is evident from FIG. 9 and Table 5, the height of the imine peak gradually increased with the passage of time from the beginning of the mixing, while that of the aldehyde peak decreased. Eventually, 98% of aldehyde changed into imine.

Subsequently, vanillin-polylactide (PLLA-vanillin 2) was mixed with 2-(2-aminoethoxy) ethanol so that the ratio of the vanillin at the terminal and the amino group would be 1:10. After 24 hours, 100 μL of 5-mol/L hydrochloric acid (HCl) was added to the obtained mixture, which was subsequently extracted with chloroform and water three times. After the organic phase was removed by an evaporator, deuterated chloroform (CDCl₃) was added to the mixture and a structural analysis (¹H NMR) was performed. FIG. 10 shows the result. Spectra (a) and (b) in FIG. 10 are ¹H NMR spectra at "0 h" and "24 h" in FIG. 9, while spectrum (c) in FIG. 10 is the ¹H NMR spectrum of the mixture with hydrochloric acid added after the passage of 24 hours. A comparison of spectra (a)-(c) in FIG. 10 shows that the imine peak observed in (b) disappeared after the addition of the hydrochloric acid, and the aldehyde peak emerged. This fact suggested that the reaction between vanillin-polylactide (PLLA-vanillin 2) and 2-(2-aminoethoxy) ethanol is reversible, as expressed by the following reaction formula.

These values satisfy the condition that the ratio of the vanillin at the terminal and the amino group should be 1:10. FIG. 11 and Table 6 show the results of a measurement in which the proton NMR spectrum was observed for 24 hours from directly after the mixing.

TABLE 6

| No. | Reaction time (h) | Aldehyde[a] (—CHO) | Imine[a] (—CH=N—) | Conversion (%) |
|---|---|---|---|---|
| 1 | 0 | 1 | 0 | 0 |
| 2 | 1 | 2.11 | 1 | 32 |
| 3 | 3 | 0.29 | 1 | 78 |
| 4 | 6 | 0.077 | 1 | 93 |
| 5 | 24 | 0.015 | 1 | 98 |

As is evident from FIG. 11 and Table 6, the height of the imine peak gradually increased with the passage of time from the beginning of the mixing, while that of the aldehyde peak gradually decreased. Eventually, 98% of aldehyde changed into imine.

Subsequently, vanillin-polylactide (PDLA-vanillin 6) was mixed with 2-(2-aminoethoxy) ethanol so that the ratio of the vanillin at the terminal and the amino group would be 1:10. After 24 hours, 100 μL of 5-mol/L hydrochloric acid (HCl) was added to the obtained mixture, which was subsequently extracted with chloroform and water three times. After the organic phase was removed by an evaporator, deuterated chloroform (CDCl₃) was added to the mixture and a structural analysis (¹H NMR) was performed. FIG. 12 shows the result. Spectra (a) and (b) in FIG. 12 are NMR spectra at "0 h" and "24 h" in FIG. 11, while spectrum (c) in FIG. 12 is the NMR spectrum of the mixture with

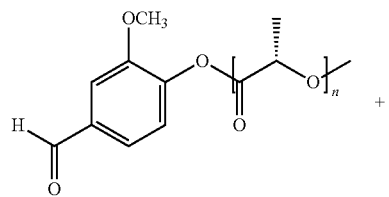

PLLA-vanilllin

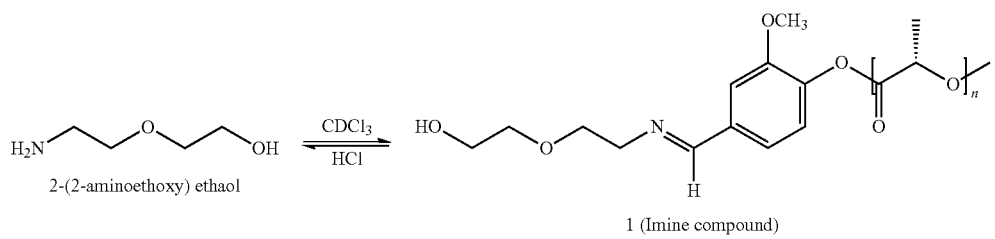

2-(2-aminoethoxy) ethaol 1 (Imine compound)

Experimental Example 4

Initially, 30 mg of vanillin-polylactide in Production Example 6 (PDLA-vanillin 6) was dissolved in 0.608 mL of chloroform-d, and 0.192 mL of a solution prepared by diluting 0.1 mL of 2-(2-aminoethoxy) ethanol with 20 mL of chloroform was dropped into the chloroform-d solution.

hydrochloric acid added after the passage of 24 hours. A comparison of spectra (a)-(c) in FIG. 12 shows that the imine peak observed in (b) disappeared after the addition of the hydrochloric acid, and the aldehyde peak emerged. This fact suggested that the reaction between vanillin-polylactide (PDLA-vanillin 6) and 2-(2-aminoethoxy) ethanol is reversible, as expressed by the following reaction formula.

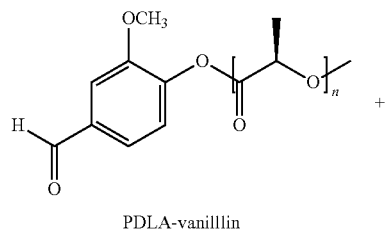

PDLA-vanilllin

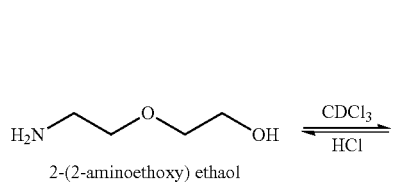

2-(2-aminoethoxy) ethaol

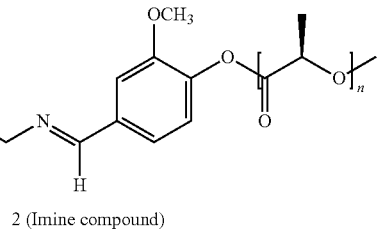

2 (Imine compound)

Experimental Example 5

Using the following samples a-d, an experiment for investigating the morphological change associated with the reversible reaction between the aldehyde at a terminal of the vanillin-polylactide and the primary amine was performed.

Samples a-d were prepared as follows.

<1. Preparation of Samples a and b>

Initially, 30 mg of vanillin-polylactide in Production Example 2 (PLLA-vanillin 2) was dissolved in 0.692 mL of chloroform-d so that the ratio of the vanillin at the terminal and the amino group would be 1:1. Then, 0.108 mL of a solution prepared by diluting 0.2 mL of 2-(2-aminoethoxy) ethanol with 20 mL of chloroform was dropped into the chloroform-d solution. After 24 hours, a mixture was obtained from the solution (this mixture is hereinafter called "Polymer 1"). From the results of Experimental Examples 3 and 4 described earlier, this Polymer 1 is most likely to be the vanillin-polylactide in which the aldehyde has changed into imine.

Subsequently, 0.8 mL of a solution of Polymer 1 dissolved in a chloroform-d solvent was dropped into 40 mL of methanol to obtain Sample a.

Furthermore, Sample a was subjected to centrifugal separation at 3500 rpm and 4° C. for 20 minutes. After the evaporation treatment of the supernatant, the sample was once more dissolved in 0.8 mL of chloroform, and the solution was dropped into 16 mL of methanol (for reprecipitation) to obtain Sample b.

<2. Preparation of Samples c and d>

After 100 μL of 5-mol/L hydrochloric acid (HCl) was added to Polymer 1 mentioned earlier, the mixture was extracted with chloroform and water three times, and the organic phase was removed by an evaporator to obtain a polymer. From the results of Experimental Examples 3 and 4, this polymer is most likely to be a vanillin-polylactide. Accordingly, this polymer is hereinafter called "PLLA-vanillin(2)".

Subsequently, as in the case of Polymer 1, 0.8 mL of a solution of PLLA-vanillin(2) dissolved in a chloroform-d solvent was dropped into 40 mL of methanol to obtain Sample c.

Furthermore, Sample c was subjected to centrifugal separation at 3500 rpm and 4° C. for 20 minutes. After the evaporation treatment of the supernatant, the sample was once more dissolved in 0.8 mL of chloroform, and the solution was dropped into 16 mL of methanol (for reprecipitation) to obtain Sample d.

Figure 13:
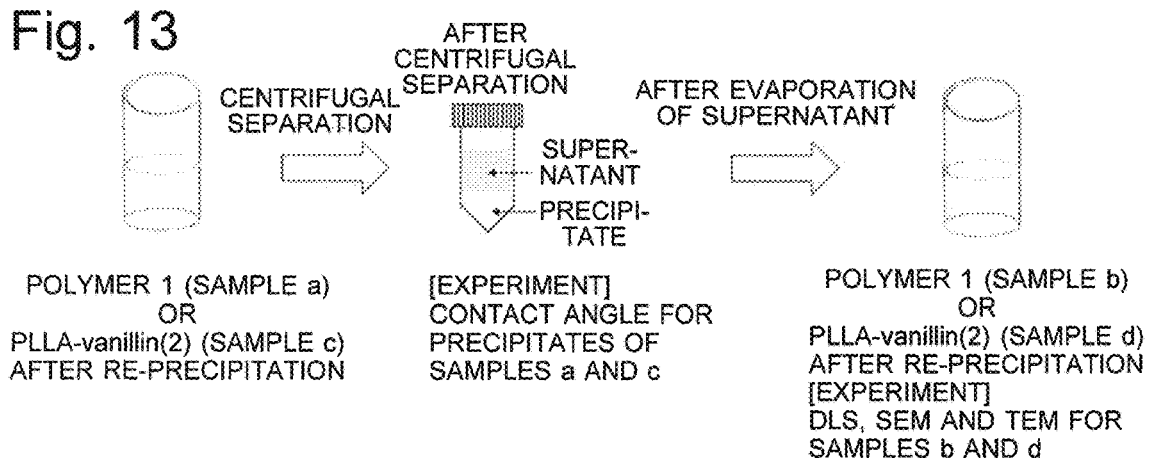
FIG. 13 illustrates the procedure of an experiment on the morphological change associated with the reversible reaction between the aldehyde group at a terminal of the vanillin-polylactide according to the first embodiment of the present invention and the primary amine.
Figure 14A:
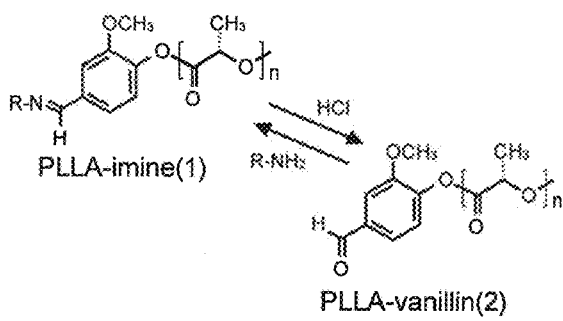
FIGS. 14A-14E shows the results of experiments on the morphological change associated with the reversible reaction between the aldehyde group at a terminal of the vanillin-polylactide according to the first embodiment of the present invention and the primary amine, where

FIG. 14A shows the reversible reaction of Polymer 1 and PLLA-vanillin(2), and FIG. 13 schematically shows the procedure for obtaining Samples a-d from Polymer 1 and PLLA-vanillin(2).

<3. Check of Morphological Change>

Figure 14B:
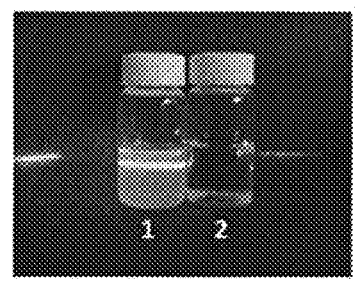

FIG. 14B show Samples b and d illuminated with a red laser. Numerals "1" and "2" in the figures correspond to numerals "1" and "2" in FIG. 14A, respectively. As can be seen in FIG. 14B, Tyndall phenomenon was observed in Sample b, labelled "1". This fact suggested that a large number of micro-sized particles (nanoparticles) were contained in the methanol, and those nanoparticles were in Brownian motion. On the other hand, Sample d, labelled "2", allowed the red laser beam to penetrate through. This fact suggested that the particles were precipitated in aggregated forms, i.e. the particles had large sizes.

Figure 14C:
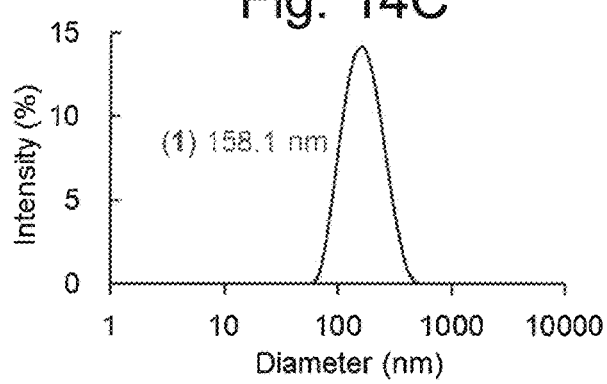

FIG. 14C shows the result of a particle size measurement of Sample b by dynamic light scattering (DLS). The figure demonstrates that the average size of the particles contained in Sample b was 158.1 nm.

Figure 14D:
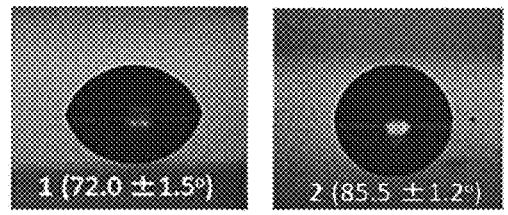
Figure 14E:
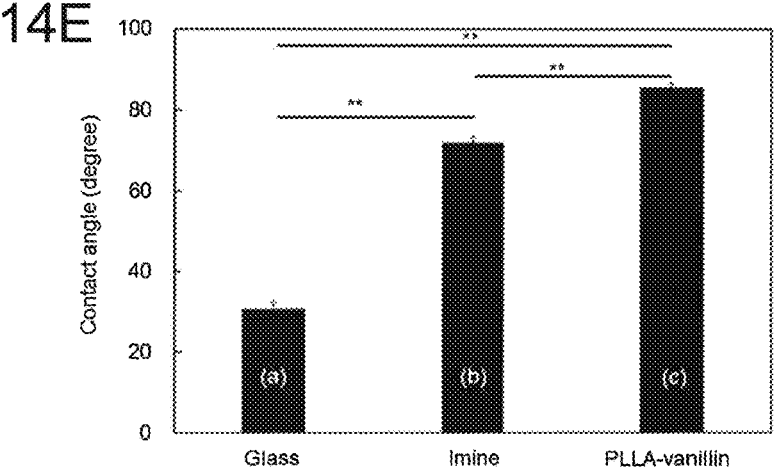

FIGS. 14D and 14E show Samples a and c individually placed on a glass plate by spin-coating, with water subsequently dropped onto them, as well as the measured result of the contact angle of the samples. The contact angle of Sample a, labelled "1", was 72.0°±1.5°, while that of Sample c, labelled "2", was 85.5°±1.2°. A significance test confirmed that the two values were significantly different (n=5, $p<0.01$). That is to say, it was demonstrated that Polymer 1 was hydrophilic, whereas Sample c (PLLA-vanillin(2)), whose terminal was not a hydrophilic group, was hydrophobic. Thus, it was qualitatively confirmed that Polymer 1 had a protruding hydroxyl group (which is a hydrophilic functional group) which was in contact with the surface of the glass plate.

Figure 15:
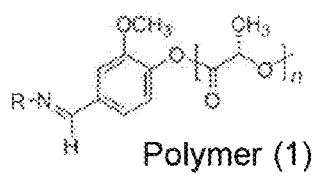
FIG. 15 is an SEM image of Polymer 1 and PLLA-vanillin(2).
Figure 15:
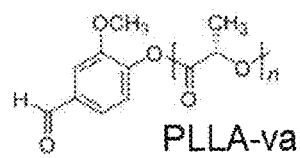
Figure 15:
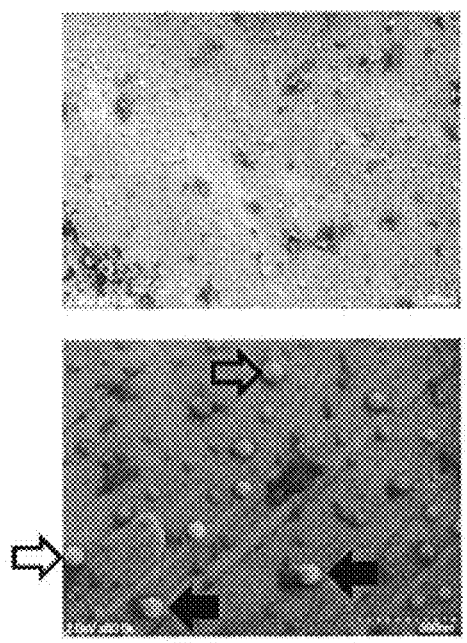
Figure 15:
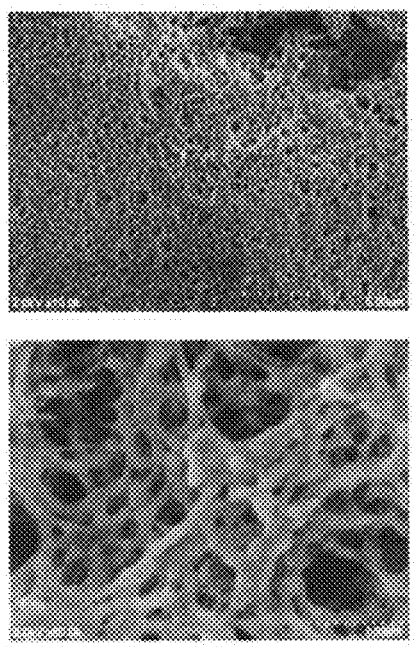
Figure 16:
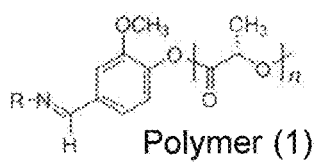
FIG. 16 is an TEM image of Polymer 1 and PLLA-vanillin(2).
Figure 16:
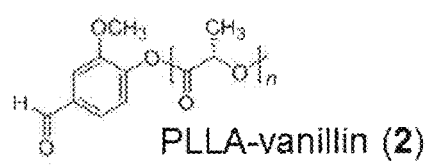
Figure 16:
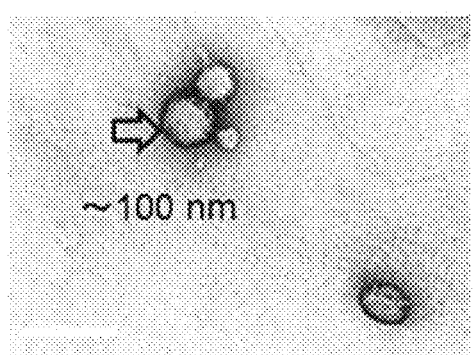
Figure 16:
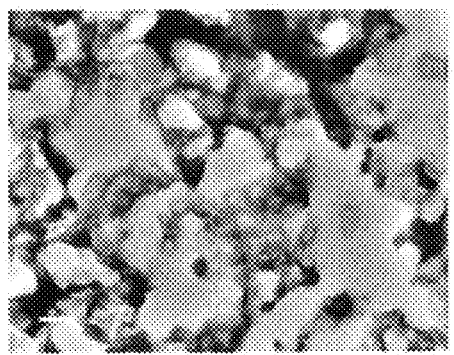

FIGS. 15 and 16 are SEM (scanning electron microscope) and TEM (transmission electron microscope) images of Samples b and d, respectively. The scale bars in FIG. 16 both indicate a length of 0.2 μm. These figures demonstrate that Polymer 1 takes a particle-like form in methanol, while PLLA-vanillin(2) takes a net-like form in methanol.

The results shown in FIGS. 14A-16 demonstrate that the vanillin-polylactide is hydrophobic but can be a molecule having both hydrophobic and hydrophilic natures by changing into Polymer 1. The vanillin-polylactide (Sample d) and Polymer 1 (Sample b) also differ from each other in morphology as well as in polarity.

Figure 17:
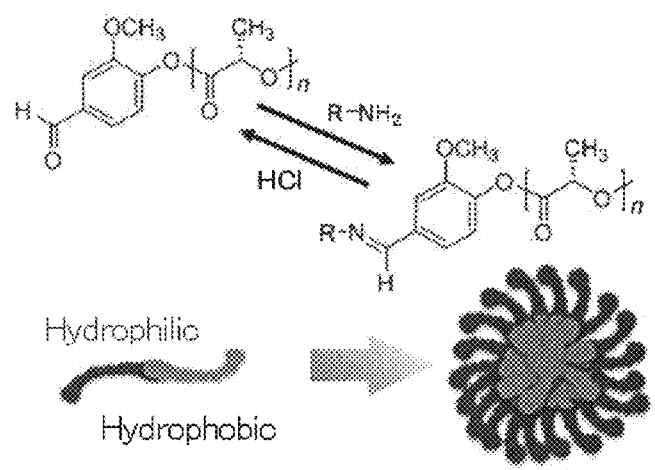
FIG. 17 shows an estimated morphological change associated with the reversible reaction between the aldehyde group at a terminal of the vanillin-polylactide according to the first embodiment of the present invention and the primary amine.

That is to say, the nanoparticle composed of Polymer 1 forms a micelle structure having hydrophobic portions on the inside and hydrophilic portions on the outside. Under acidic conditions, this nanoparticle is hydrolyzed and changes into the vanillin-polylactide which is a net-like structure (see FIG. 17).

Both vanillin and polylactide are obtained from plant-based materials and highly biocompatible. Micelle structures with such a biocompatibility have conventionally been used as DDS (drug delivery system) materials for containing a drug inside the hydrophobic core while improving the dispersibility in the blood by the action of the outer hydrophilic group.

Polymer 1 becomes hydrolyzed when treated with dilute hydrochloric acid. Therefore, under the presence of the gastric acid, the micelle structure containing a drug in the hydrophobic core changes into vanillin-polylactide and becomes absorbed into the body with the drug. Accordingly, the vanillin-polylactide according to the present embodiment has the potential to be used as DDS materials. For example, it will probably be useful as a carrier of an oral agent that should be absorbed into the body after reaching the stomach.

Second Embodiment: Polylactide Derivatives

Table 7 shows Production Examples of polylactide derivatives according to the first aspect of the present invention other than those presented in the first embodiment. The molecular weights in the analysis shown Table 7 were determined using the results of GPC using a standard solution of polystyrene tetrahydrofuran. The molecular weights and PDI shown in Table 7 were the results obtained by the analysis in RI mode.

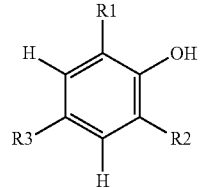

(8)

A structural analysis of polylactide derivatives 1-18 shown in Table 7 was performed using proton NMR spectra. FIGS. 18A-26B show the results.

Figure 18A:
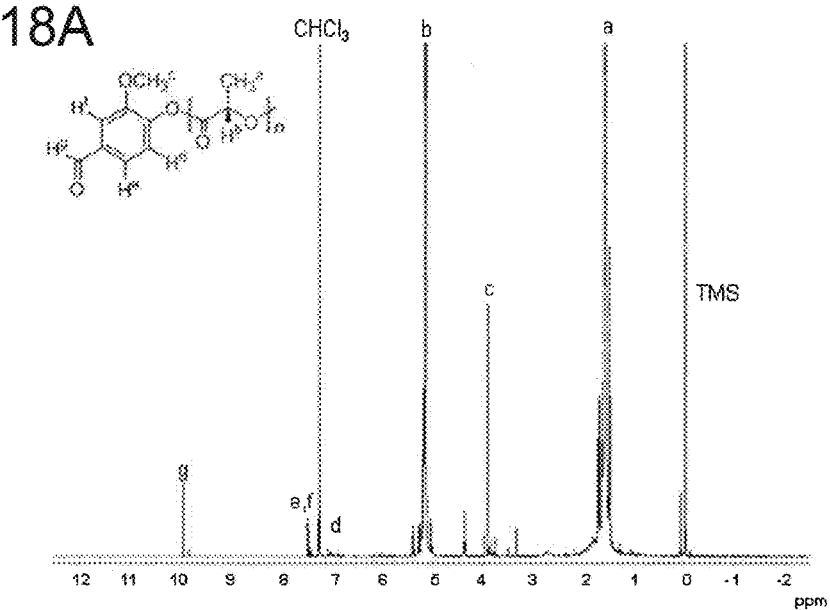
FIGS. 18A and 18B are $^1$H NMR spectra of polylactide derivatives (1) and (2) according to the second embodiment shown in Table 7.
Figure 18B:
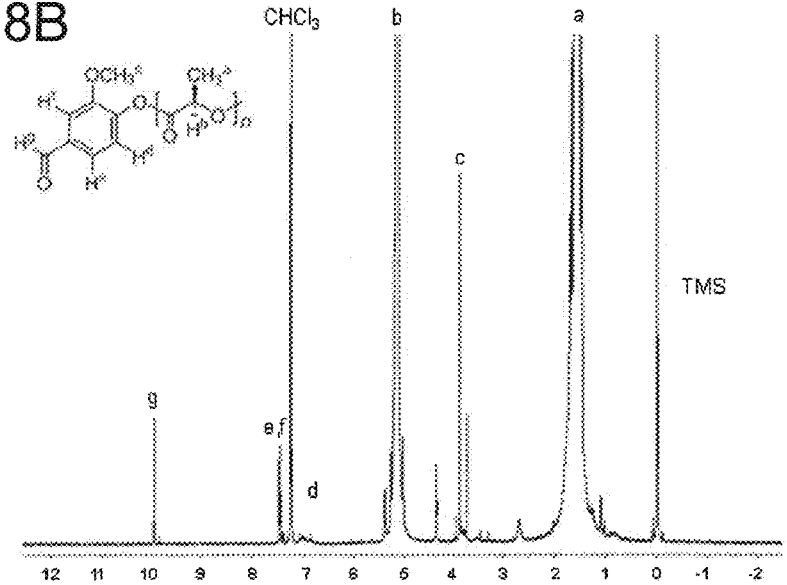

FIGS. 18A and 18B are $^1$H NMR spectra of PLLA-vanillin(1) and PDLA-vanillin(2) respectively obtained by ring-opening polymerization of the L- and D-enantiomers of lactide as the monomer, using vanillin as the initiator.

Figure 19A:
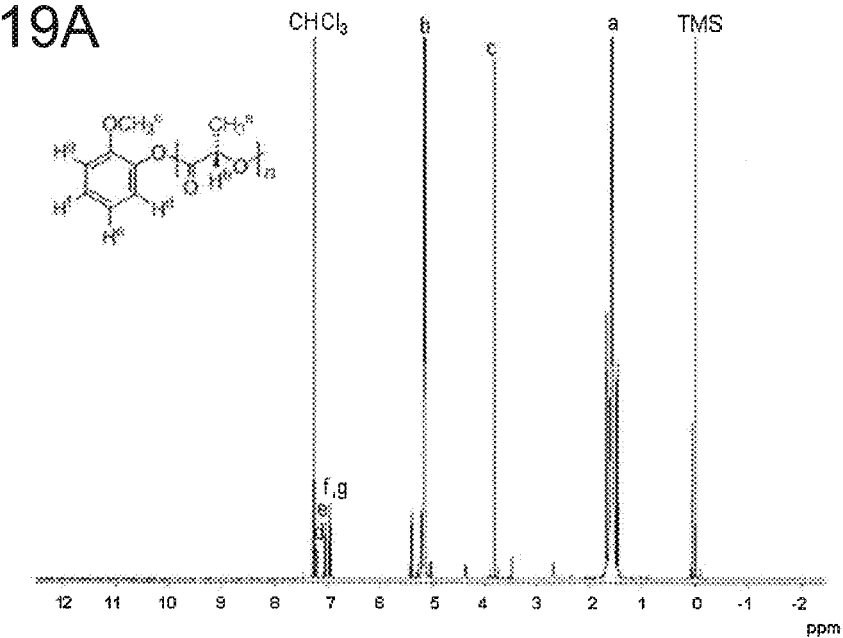
FIGS. 19A and 19B are $^1$H NMR spectra of polylactide derivatives (3) and (4) according to the second embodiment shown in Table 7.
Figure 19B:
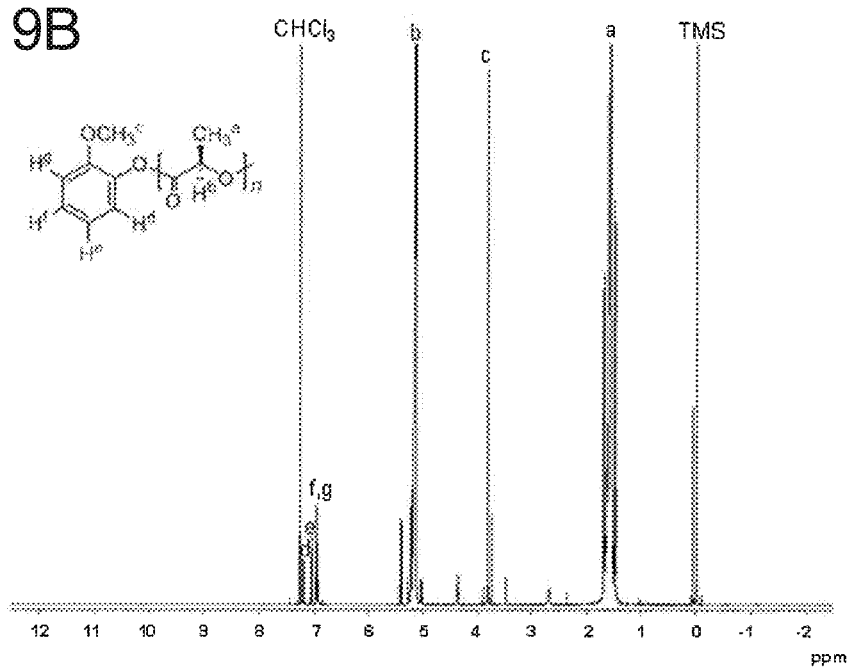

FIGS. 19A and 19B are $^1$H NMR spectra of PLLA-guiacol(3) and PDLA-guiacol(4) respectively obtained by ring-opening polymerization of the L- and D-enantiomers of lactide as the monomer, using guiacol as the initiator.

Figure 20A:
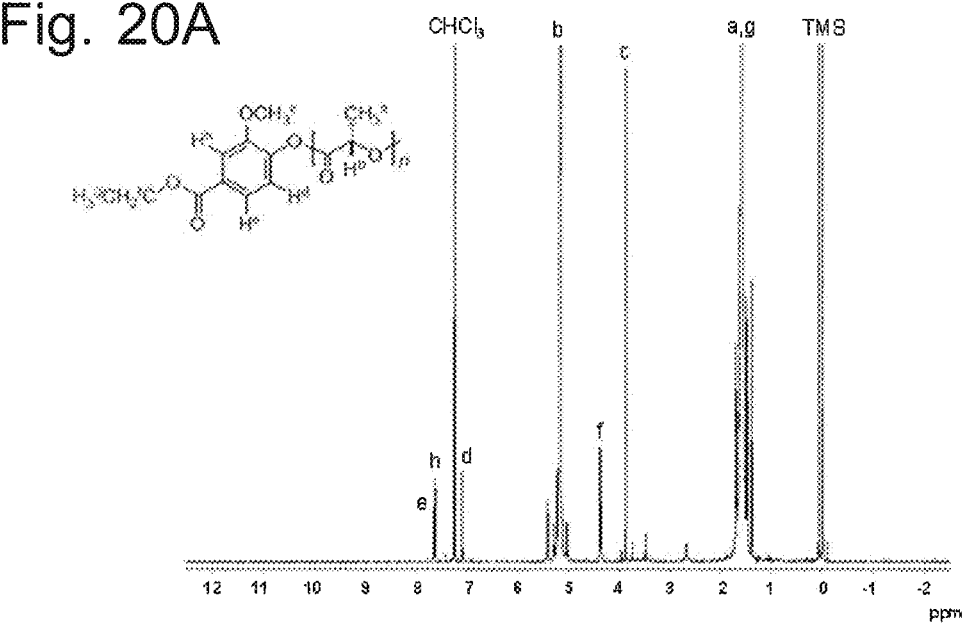
FIGS. 20A and 20B are $^1$H NMR spectra of polylactide derivatives (5) and (6) according to the second embodiment shown in Table 7.
Figure 20B:
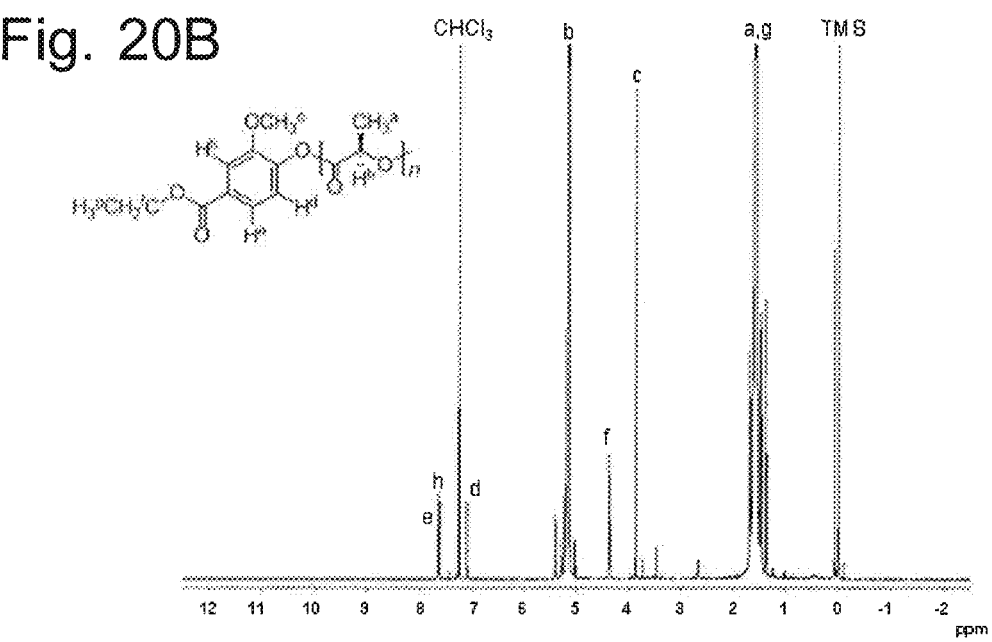

FIGS. 20A and 20B are $^1$H NMR spectra of PLLA-ethyl vanilate(5) and PDLA-ethyl vanilate(6) respectively obtained by ring-opening polymerization of the L- and D-enantiomers of lactide as the monomer, using ethyl vanilate as the initiator.

Figure 21A:
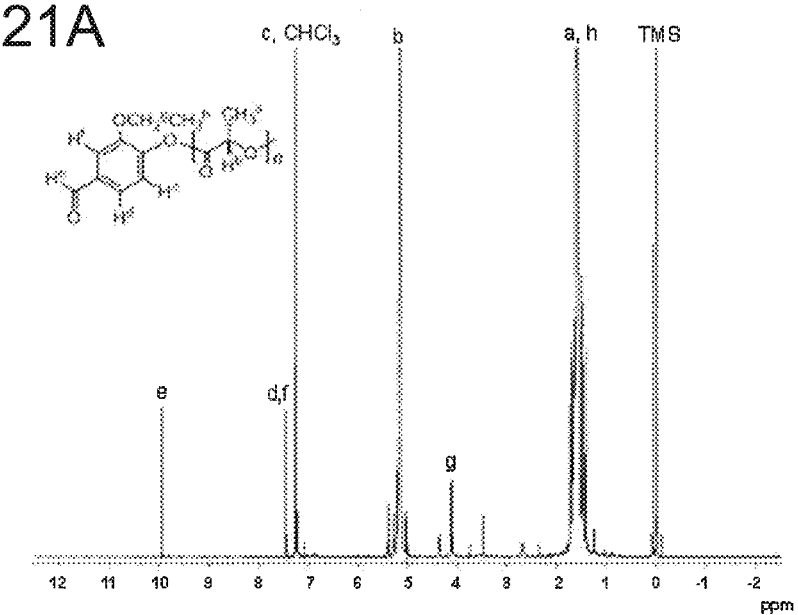
FIGS. 21A and 21B are $^1$H NMR spectra of polylactide derivatives (7) and (8) according to the second embodiment shown in Table 7.
Figure 21B:
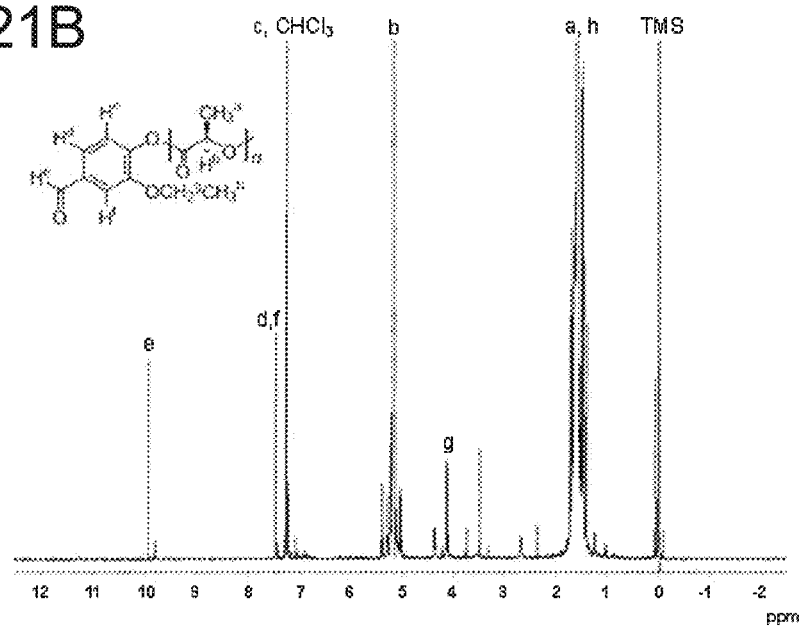

FIGS. 21A and 21B are $^1$H NMR spectra of PLLA-ethyl vanillin(7) and PDLA-ethyl vanillin(8) respectively obtained by ring-opening polymerization of the L- and D-enantiomers of lactide as the monomer, using ethyl vanillin as the initiator.

Figure 22A:
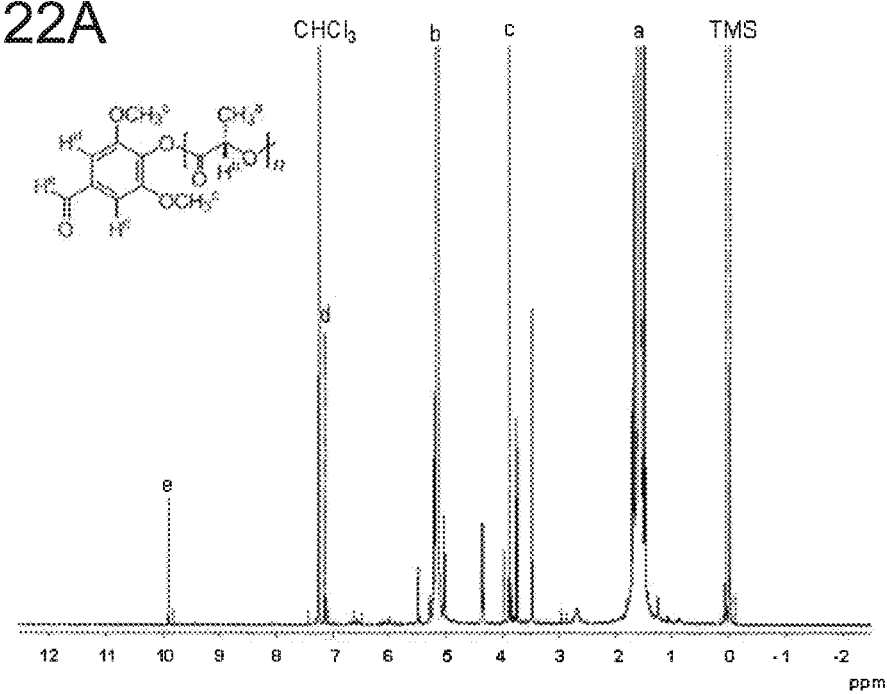
FIGS. 22A and 22B are $^1$H NMR spectra of polylactide derivatives (9) and (10) according to the second embodiment shown in Table 7.
Figure 22B:
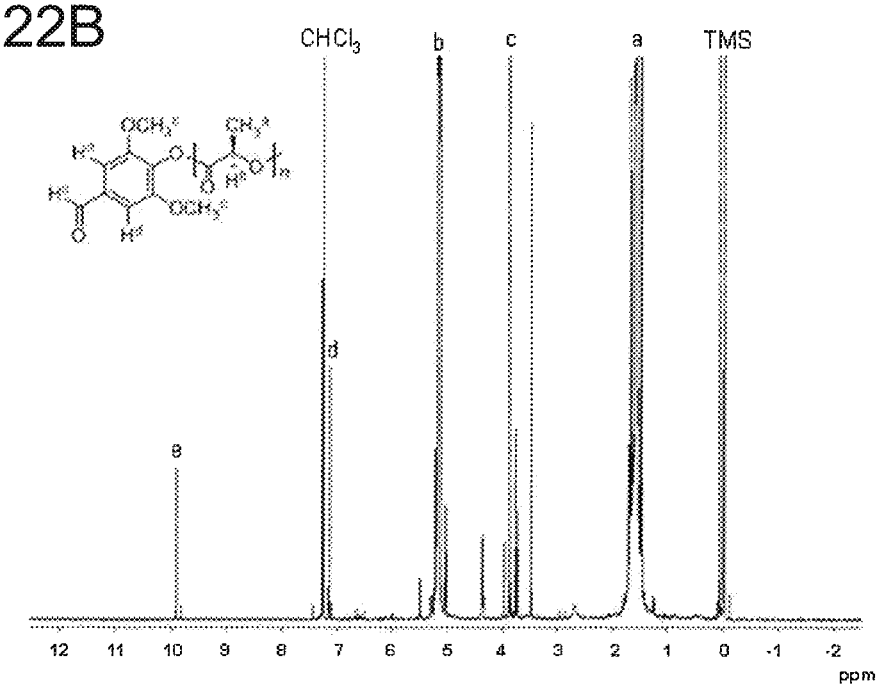

FIGS. 22A and 22B are $^1$H NMR spectra of PLLA-syringaldehyde(9) and PDLA-syringaldehyde(10) respectively obtained by ring-opening polymerization of the L- and D-enantiomers of lactide as the monomer, using syringaldehyde as the initiator.

Figure 23A:
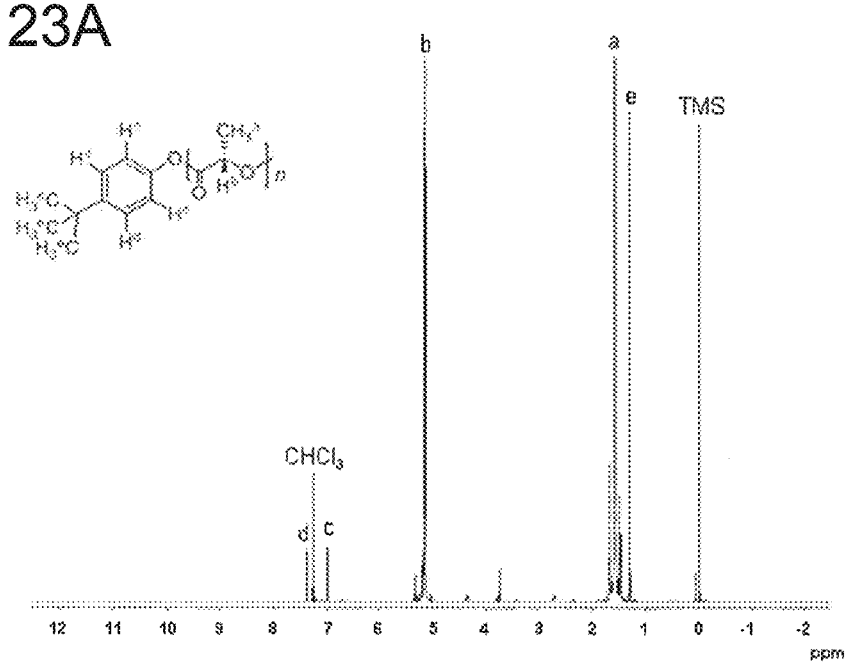
FIGS. 23A and 23B are $^1$H NMR spectra of polylactide derivatives (11) and (12) according to the second embodiment shown in Table 7.
Figure 23B:
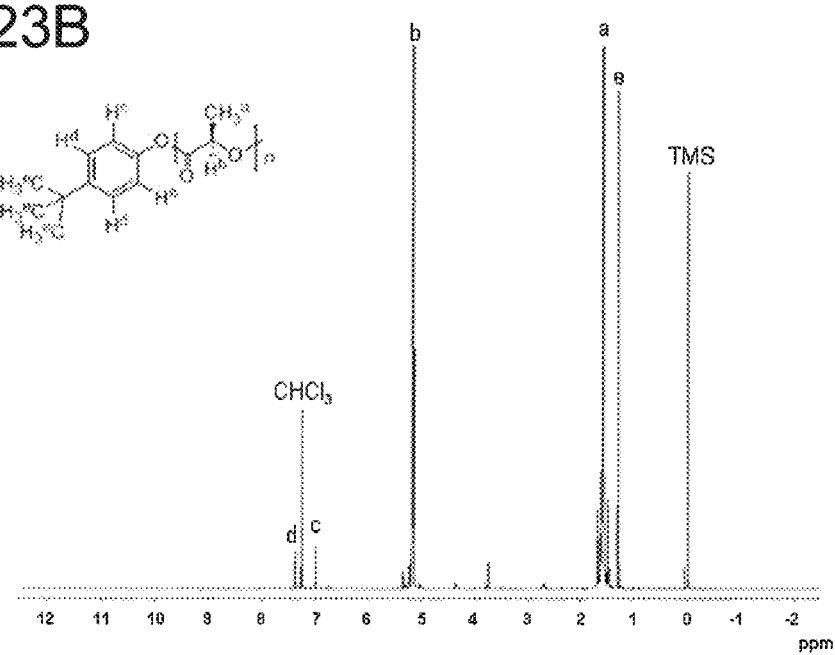

FIGS. 23A and 23B are $^1$H NMR spectra of PLLA-4-tert-butylphenol(11) and PDLA-4-tert-butylphenol(12) respec-

TABLE 7

| Entry | $R_1$ | $R_2$ | $R_3$ | Product | Yield | $M_n$ (×10$^3$) | $M_w$ (×10$^3$) | PDI |
|---|---|---|---|---|---|---|---|---|
| 1 | OCH$_3$ | H | CHO | PLLA-vanillin (1) | 89 | 11.4 | 22.5 | 1.97 |
| 2 | OCH$_3$ | H | CHO | PDLA-vanillin (2) | 88 | 16.8 | 32.9 | 1.95 |
| 3 | OCH$_3$ | H | H | PLLA-guiacol (3) | 91 | 12.9 | 20.6 | 1.6 |
| 4 | OCH$_3$ | H | H | PDLA-guiacol (4) | 91 | 10.9 | 17.9 | 1.63 |
| 5 | OCH$_3$ | H | COOCH$_2$CH$_3$ | PLLA-ethyl vanilate (5) | 80 | 18.5 | 31.6 | 1.71 |
| 6 | OCH$_3$ | H | COOCH$_2$CH$_3$ | PDLA-ethyl vanilate (6) | 82 | 17.2 | 29.8 | 1.74 |
| 7 | OCH$_2$CH$_3$ | H | CHO | PLLA-ethyl vanillin (7) | 91 | 26 | 40.1 | 1.55 |
| 8 | OCH$_2$CH$_3$ | H | CHO | PDLA-ethyl vanillin (8) | 92 | 25.3 | 38.6 | 1.52 |
| 9 | OCH$_3$ | OCH$_3$ | CHO | PLLA-syringaldehyde (9) | 15 | 7.6 | 9.5 | 1.24 |
| 10 | OCH$_3$ | OCH$_3$ | CHO | PDLA-syringaldehyde (10) | 15 | 7.5 | 9.4 | 1.25 |
| 11 | H | H | CH(CH$_3$)$_3$ | PLLA-4-tert-butylphenol (11) | 87 | 9.2 | 16 | 1.73 |
| 12 | H | H | CH(CH$_3$)$_3$ | PDLA-4-tert-butylphenol (12) | 88 | 9.2 | 15.6 | 1.7 |
| 13 | H | H | (CH$_2$)$_4$CH$_3$ | PLLA-4-amylphenol (13) | 90 | 9.9 | 16.2 | 1.64 |
| 14 | H | H | (CH$_2$)$_4$CH$_3$ | PDLA-4-amylphenol (14) | 90 | 8.2 | 14 | 1.71 |
| 15 | H | H | Cl | PLLA-4-chlorophenol (15) | 90 | 13.5 | 23.3 | 1.72 |
| 16 | H | H | Cl | PDLA-4-chlorophenol (16) | 86 | 13.9 | 24.6 | 1.78 |
| 17 | H | H | F | PLLA-4-fluorophenol (17) | 86 | 12.2 | 20.9 | 1.71 |
| 18 | H | H | F | PDLA-4-fluorophenol (18) | 87 | 11.7 | 20.3 | 1.74 |

The polylactide derivatives shown in Table 7 were each obtained by ring-opening polymerization of lactide as the monomer, using, as the initiator, a compound expressed by the following general formula (8) (with at least one of R1-R3 selected from the chlorine atom, fluorine atom, aldehyde group, alkoxy group and alkyl group).

tively obtained by ring-opening polymerization of the L- and D-enantiomers of lactide as the monomer, using 4-tert-butylphenol as the initiator.

Figure 24A:
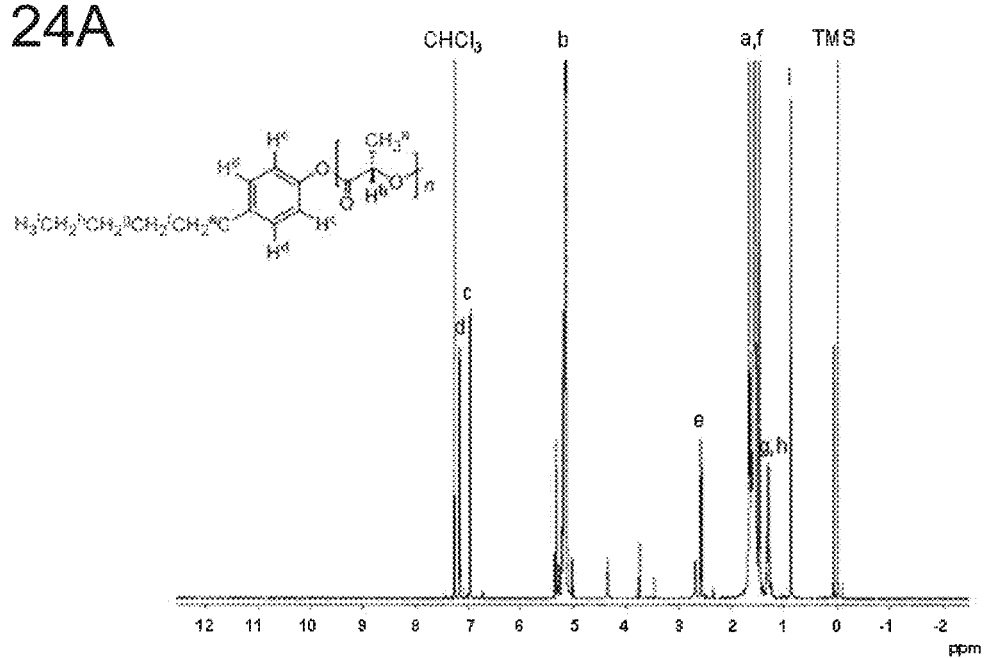
FIGS. 24A and 24B are $^1$H NMR spectra of polylactide derivatives (13) and (14) according to the second embodiment shown in Table 7.
Figure 24B:
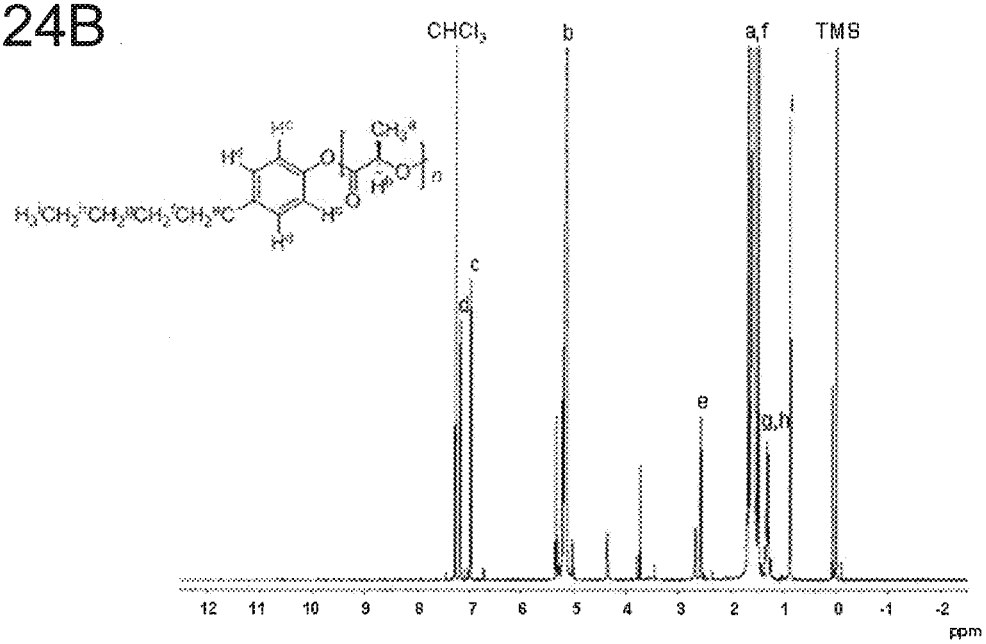

FIGS. 24A and 24B are $^1$H NMR spectra of PLLA-4-amylphenol(13) and PDLA-4-amylphenol(14) respectively obtained by ring-opening polymerization of the L- and D-enantiomers of lactide as the monomer, using 4-amylphenol as the initiator.

Figure 25A:
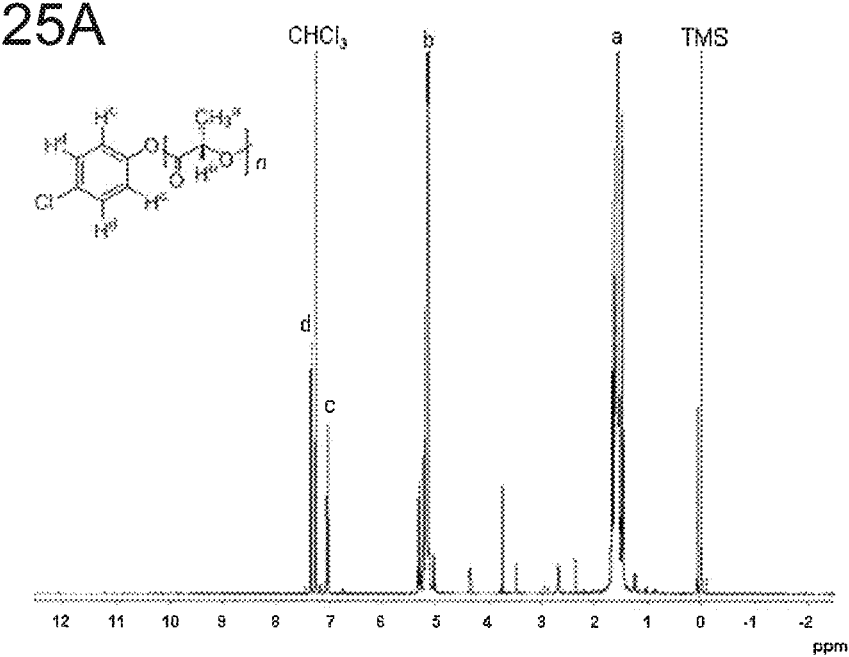
FIGS. 25A and 25B are ¹H NMR spectra of polylactide derivatives (15) and (16) according to the second embodiment shown in Table 7.
Figure 25B:
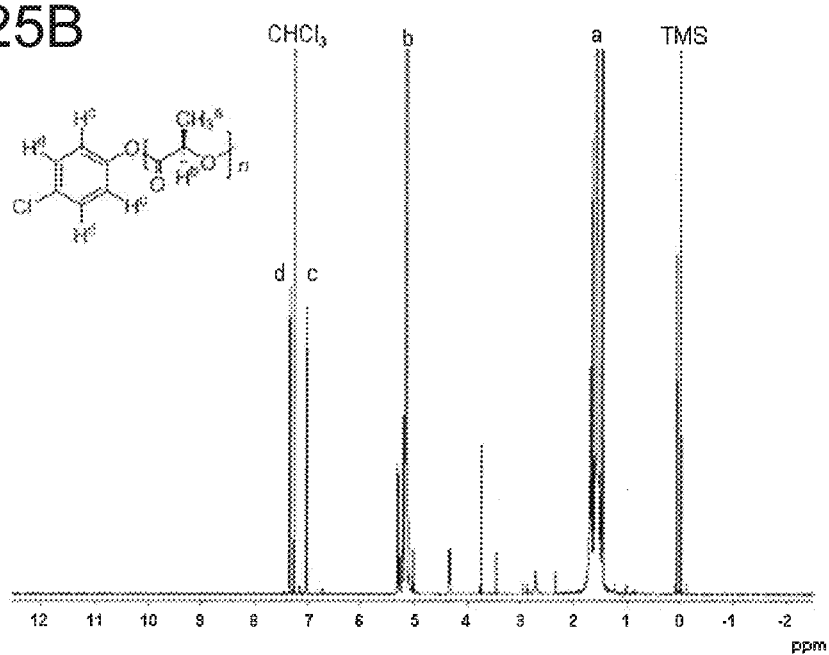

FIGS. 25A and 25B are $^1$H NMR spectra of PLLA-4-chlorophenol(15) and PDLA-4-chlorophenol(16) respectively obtained by ring-opening polymerization of the L- and D-enantiomers of lactide as the monomer, using 4-chlorophenol as the initiator.

Figure 26A:
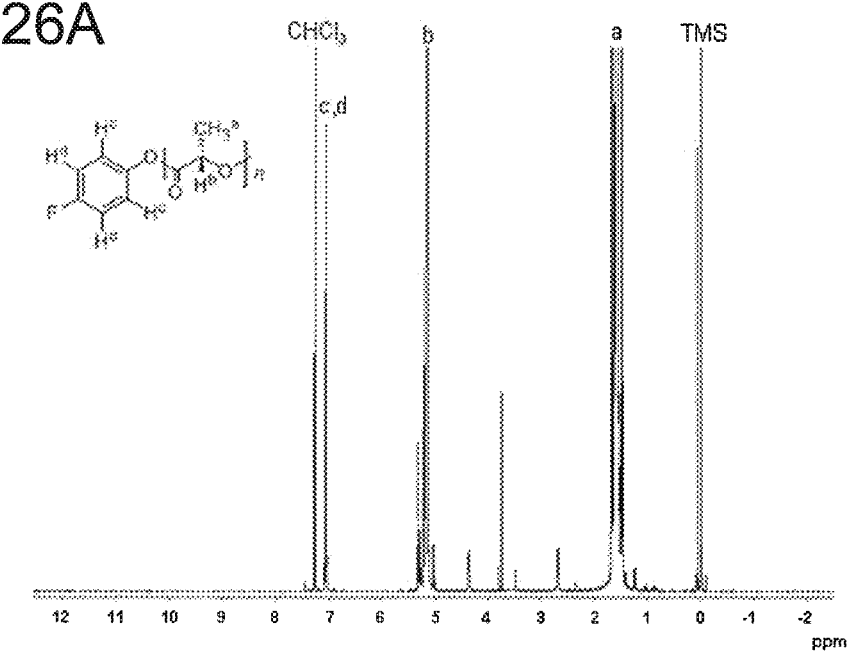
FIGS. 26A and 26B are ¹H NMR spectra of polylactide derivatives (17) and (18) according to the second embodiment shown in Table 7.
Figure 26B:
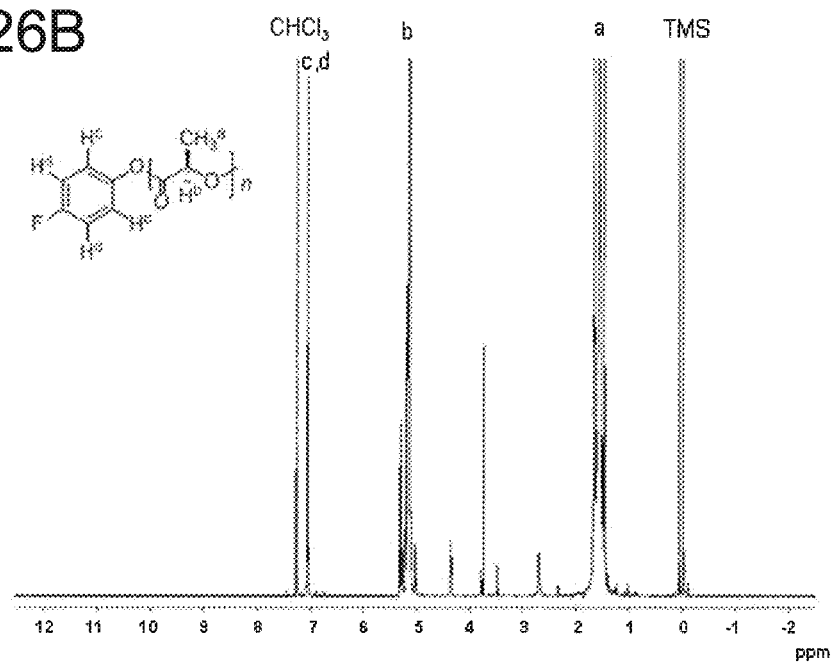
Figure 27:
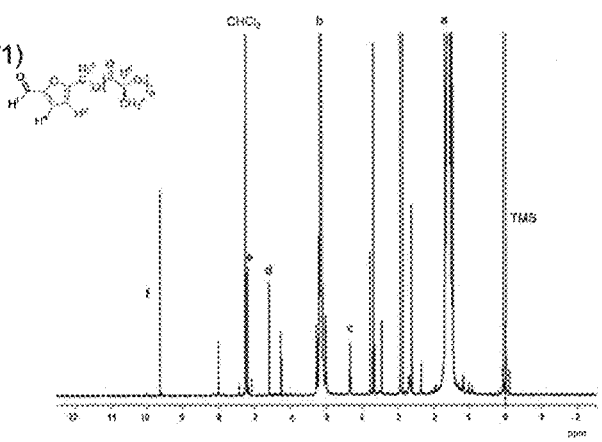
FIG. 27 shows ¹H NMR spectra of polylactide derivatives obtained in Production Examples 1-4 in the third embodiment.
Figure 27:
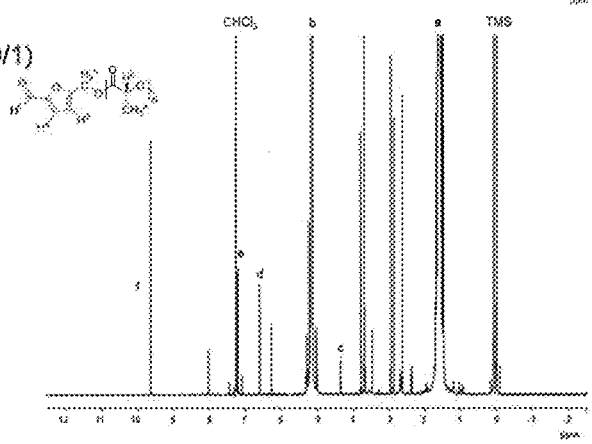
Figure 27:
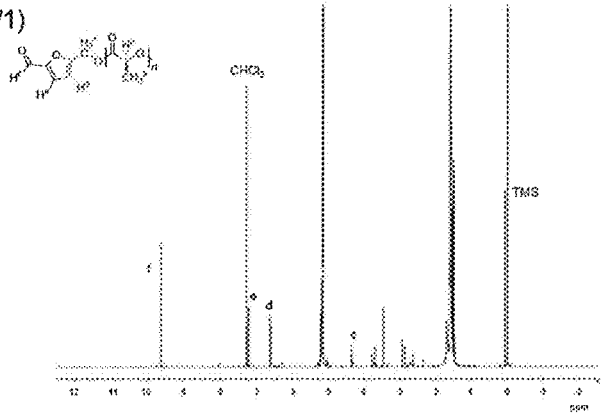
Figure 27:
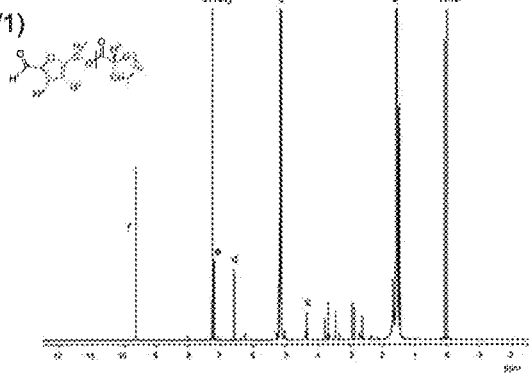

FIGS. 26A and 26B are $^1$H NMR spectra of PLLA-4-fluorophenol(17) and PDLA-4-fluorophenol(18) respectively obtained by ring-opening polymerization of the L- and D-enantiomers of lactide as the monomer, using 4-fluorophenol as the initiator.

Third Embodiment: Polylactide Derivatives

The polylactide derivative according to the second aspect of the present invention is expressed by the following formula (4).

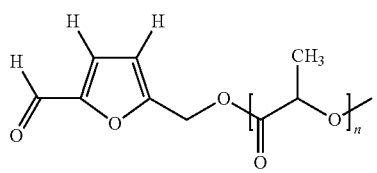

(4)

This polylactide derivative is produced by ring-opening polymerization of lactide as the monomer, using hydroxymethylfurfural (HMF) as the initiator. A reaction formula of this process is as follows.

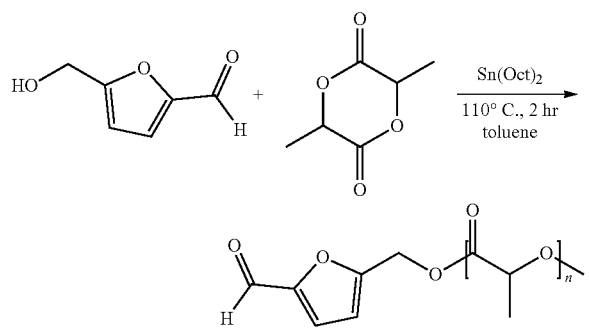

Specific production examples of this polylactide derivative (which is hereinafter called the "HMF-polylactide") are hereinafter described.

<1. Synthesis of HMF-Polylactides>

Production Example 1

Using (L,L)-lactide as the monomer (M) and HMF as the initiator (I), 1.0 g of (L,L)-lactide and a required amount of HMF were introduced into an ampule tube so that the molar ratio (M/I) of the monomer (M) and initiator (I) would be 80/1. Then, the gas inside the tube was replaced by nitrogen. Subsequently, 0.55 mL of toluene solution of $Sn(Oct)_2$ prepared at a concentration of 1 mol % was added, and the tube was heated in an oil bath at a temperature of 110° C. for two hours to promote the polymerization of (L,L)-lactide. The obtained reaction mixture was dissolved in 10 mL of chloroform, which was subsequently put in 200 mL of methanol and the reprecipitated methanol-insoluble part was collected. The yield was 95%. The methanol-insoluble part obtained in Production Example 1 may be hereinafter called the "PLLA-HMF(1)".

Production Example 2

Using (D,D)-lactide as the monomer (M) and HMF as the initiator (I), 1.0 g of (D,D)-lactide and a required amount of HMF were introduced into an ampule tube so that the molar ratio (M/I) of the monomer (M) and initiator (I) would be 80/1. Then, the gas inside the tube was replaced by nitrogen. Subsequently, 0.55 mL of toluene solution of $Sn(Oct)_2$ prepared at a concentration of 1 mol % was added, and the tube was heated in an oil bath at a temperature of 110° C. for two hours to promote the polymerization of (D,D)-lactide. The obtained reaction mixture was dissolved in 10 mL of chloroform, which was subsequently put in 200 mL of methanol and the reprecipitated methanol-insoluble part was collected. The yield was 87%. The methanol-insoluble part obtained in Production Example 2 may be hereinafter called the "PDLA-HMF(2)".

Production Example 3

Using (L,L)-lactide as the monomer (M) and HMF as the initiator (I), 1.0 g of (L,L)-lactide and a required amount of HMF were introduced into an ampule tube so that the molar ratio (M/I) of the monomer (M) and initiator (I) would be 20/1. Then, the gas inside the tube was replaced by nitrogen. Subsequently, 2.2 mL of toluene solution of $Sn(Oct)_2$ prepared at a concentration of 1 mol % was added, and the tube was heated in an oil bath at a temperature of 110° C. for two hours to promote the polymerization of (L,L)-lactide. The obtained reaction mixture was dissolved in 10 mL of chloroform, which was subsequently put in 200 mL of methanol and the reprecipitated methanol-insoluble part was collected. The yield was 96%. The methanol-insoluble part obtained in Production Example 3 may be hereinafter called the "PLLA-HMF(3)".

Production Example 4

Using (D,D)-lactide as the monomer (M) and HMF as the initiator (I), 1.0 g of (D,D)-lactide and a required amount of HMF were introduced into an ampule tube so that the molar ratio (M/I) of the monomer (M) and initiator (I) would be 20/1. Then, the gas inside the tube was replaced by nitrogen. Subsequently, 2.2 mL of toluene solution of $Sn(Oct)_2$ prepared at a concentration of 1 mol % was added, and the tube was heated in an oil bath at a temperature of 110° C. for two hours to promote the polymerization of (D,D)-lactide. The obtained reaction mixture was dissolved in 10 mL of chloroform, which was subsequently put in 200 mL of methanol and the reprecipitated methanol-insoluble part was collected. The yield was 95%. The methanol-insoluble part obtained in Production Example 4 may be hereinafter called the "PDLA-HMF(4)".

<2. Analysis of HMF-Polylactides>

A molecular-weight analysis of the methanol-insoluble parts obtained in Production Examples 1-4 was performed. Table 8 shows the results. It should be noted that Table 8 additionally shows the results of Examples 5 and 6 produced for comparison with Production Examples 1-4. A reaction formula of the synthesis of Comparative Production Examples 5 and 6 is shown below.

TABLE 8

| No. | Product | Monomer | Initiator | [M]/[I] | Yield (%) | $M_{nth}$ $(\times 10^3)^a$ | $M_n$ $(\times 10^3)^b$ | Mn $(\times 10^3)^c$ | $M_w$ $(\times 10^3)^c$ | $PDI^c$ | $M_n$ $(\times 10^3)^d$ | $M_w$ $(\times 10^3)^d$ | $PDI^d$ |
|---|---|---|---|---|---|---|---|---|---|---|---|---|---|
| 1 | PLLA-HMF(1) | L-lactide | HMF | 80/1 | 95 | 11.7 | 16.9 | 11.3 | 22.4 | 1.98 | 18.3 | 30.5 | 1.67 |
| 2 | PDLA-HMF(2) | D-lactide | HMF | 80/1 | 87 | 11.7 | 17.0 | 11.8 | 21.9 | 1.86 | 17.8 | 28.4 | 1.60 |
| 3 | PLLA-HMF(3) | L-lactide | HMF | 20/1 | 95 | 3.0 | 4.5 | 3.8 | 5.5 | 1.45 | 4.4 | 6.4 | 1.45 |
| 4 | PDLA-HMF(4) | D-lactide | HMF | 20/1 | 95 | 3.0 | 4.6 | 3.9 | 5.8 | 1.5 | 4.6 | 7 | 1.51 |
| 5 | PLLA-benzylalcohol(5) | L-lactide | benzylalcohol | 20/1 | 83 | 3.0 | — | 2.7 | 3.6 | 1.27 | 2.8 | 3.8 | 1.34 |
| 6 | PDLA-benzylalcohol(6) | D-lactide | benzylalcohol | 20/1 | 84 | 3.0 | — | 2.8 | 3.5 | 1.26 | 3 | 3.9 | 1.31 |

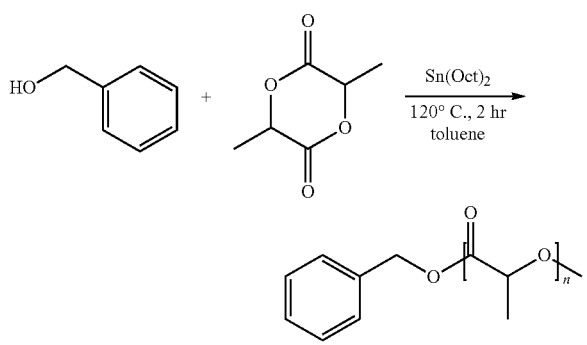

Comparative Production Example 5

Using (L,L)-lactide as the monomer (M) and benzyl alcohol as the initiator (I), 1.0 g of (L,L)-lactide and a required amount of benzyl alcohol were introduced into an ampule tube so that the molar ratio (M/I) of the monomer (M) and initiator (I) would be 20/1. Then, the gas inside the tube was replaced by nitrogen. Subsequently, 2.2 mL of toluene solution of $Sn(Oct)_2$ prepared at a concentration of 1 mol % was added, and the tube was heated in an oil bath at a temperature of 120° C. for two hours to promote the polymerization of (L,L)-lactide. The obtained reaction mixture was dissolved in 10 mL of chloroform, which was subsequently put in 200 mL of methanol and the reprecipitated methanol-insoluble part was collected. The yield was 83%. The methanol-insoluble part obtained in Comparative Production Example 5 may be hereinafter called the "PLLA-benzylalcohol(5)".

Comparative Production Example 6

Using (D,D)-lactide as the monomer (M) and benzyl alcohol as the initiator (I), 1.0 g of (D,D)-lactide and a required amount of benzyl alcohol were introduced into an ampule tube so that the molar ratio (M/I) of the monomer (M) and initiator (I) would be 20/1. Then, the gas inside the tube was replaced by nitrogen. Subsequently, 2.2 mL of toluene solution of $Sn(Oct)_2$ prepared at a concentration of 1 mol % was added, and the tube was heated in an oil bath at a temperature of 120° C. for two hours to promote the polymerization of (D,D)-lactide. The obtained reaction mixture was dissolved in 10 mL of chloroform, which was subsequently put in 200 mL of methanol and the reprecipitated methanol-insoluble part was collected. The yield was 84%. The methanol-insoluble part obtained in Comparative Production Example 6 may be hereinafter called the "PDLA-benzylalcohol(6)".

In Table 8, the molecular weight (Mnth) with superscript "a" is the theoretical molecular weight. The molecular weight (Mn) with superscript "b" is the number-average molecular weight (Mn). The number-average molecular weight (Mn), weight-average molecular weight (Mw) and molecular-weight distribution (PDI=Mw/Mn) were determined from the results of gel penetration chromatography (GPC) using a standard solution of polystyrene tetrahydrofuran. The molecular weights and PDI with superscript "c" are the results obtained by the analysis in UV mode, while those with superscript "d" are the results obtained by the analysis in RI mode.

A structural analysis of the methanol-insoluble parts obtained in Production Examples 1-4 was performed, based on their proton NMR spectra. FIGS. 27A-27D show the results. The results shown in Table 8 as well as FIGS. 27A-27D confirmed that a polylactide was formed by the reaction expressed by the aforementioned formula (13) in any of the Production Examples 1-4, with HMF introduced at a terminal of the polylactide.

<3. Reversible Reaction Between Terminal of Polylactide and Primary Amine>

Experimental Example 1

In order to confirm the reactivity of the aldehyde group of the HMF introduced at a terminal of the polylactide, an experiment similar to Experiment 1 described earlier in the first embodiment was performed using the HMF-polylactide produced in Production Example 3 (PLLA-HMF(3)). The results are shown in Table 9 and FIG. 28 as well as Table 10 and FIG. 29.

TABLE 9

| No. | Reaction time (h) | Aldehyde$^a$ (—CHO) | Imine$^a$ (—CH=N—) | Conversion (%) |
|---|---|---|---|---|
| 1 | 0 | 1 | 0 | 0 |
| 2 | 1 | 1.55 | 1 | 39 |
| 3 | 3 | 0.69 | 1 | 59 |
| 4 | 6 | 0.62 | 1 | 62 |
| 5 | 24 | 0.59 | 1 | 63 |

TABLE 10

| No. | Reaction time (h) | Aldehyde$^a$ (—CHO) | Imine$^a$ (—CH=N—) | Conversion (%) |
|---|---|---|---|---|
| 1 | 0 | 1 | 0 | 0 |
| 2 | 1 | 0.94 | 1 | 52 |
| 3 | 3 | 0.12 | 1 | 89 |
| 4 | 6 | 0.016 | 1 | 98 |
| 5 | 24 | 0 | 1 | 100 |

Figure 28:
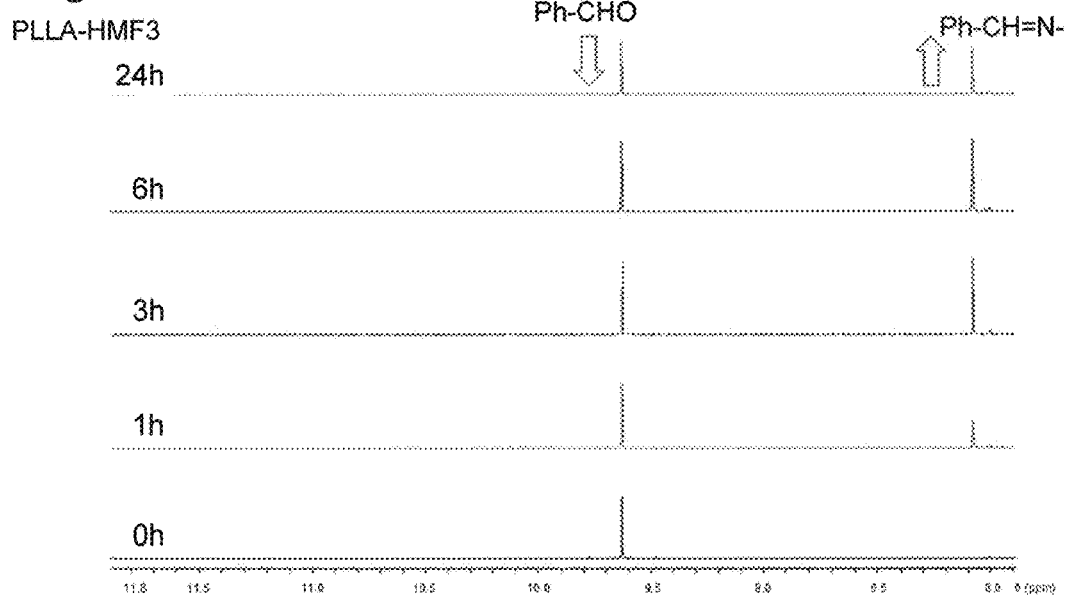
FIG. 28 is a series of ¹H NMR spectra showing the result of an experiment on the reactivity between the aldehyde group at a terminal of a polylactide derivative (PLLA-HMF) according to Production Example 3 in the third embodiment and the primary amine, the experiment performed under the condition that the ratio of HMF and amino group was 1:1.

Table 9 and FIG. 28 show the result of the experiment performed under the condition that the ratio between the vanillin at the terminal of PLLA-HMF(3) and the amino group was 1:1. Table 10 and FIG. 29 show the result of the experiment performed under the condition that the ratio between the vanillin at the terminal of PLLA-HMF(3) and the amino group was 1:10.

Figure 29:
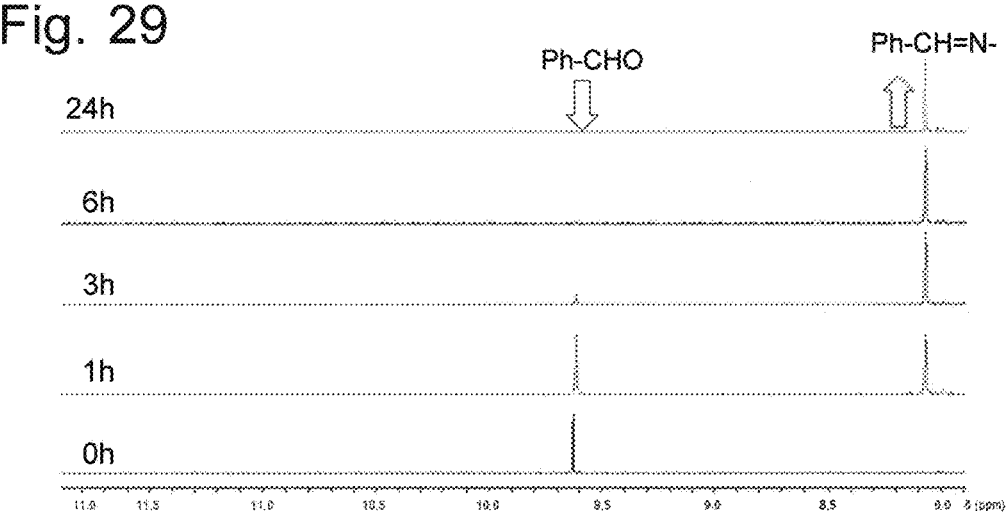
FIG. 29 is a series of ¹H NMR spectra showing the result of an experiment on the reactivity between the aldehyde group at a terminal of the polylactide derivative (PLLA-HMF) according to Production Example 3 in the third embodiment and the primary amine, the experiment performed under the condition that the ratio of HMF and amino group was 1:10.

As shown in FIG. 28 and Table 9 as well as FIG. 29 and Table 10, imine was formed with the passage of time after the mixing, both under the condition that the ratio of HMF/amino group was 1/1 and under the condition that the ratio of HMF/amino group was 1/10. Specifically, under the condition that the ratio of HMF/amino group was 1/1, 63% of the aldehyde group reacted with the amino group and formed imine during the 24-hour period from the mixing. Under the condition that the ratio of HMF/amino group was 1/10, 100% of the aldehyde group reacted with the amino group and formed imine during the 24-hour period from the mixing. A formula of the reaction between the HMF-polylactide and 2-(2-aminoethoxy) ethanol is shown below.

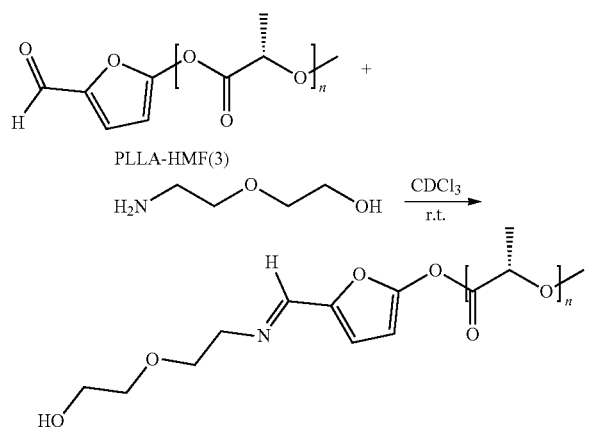

Figure 30:
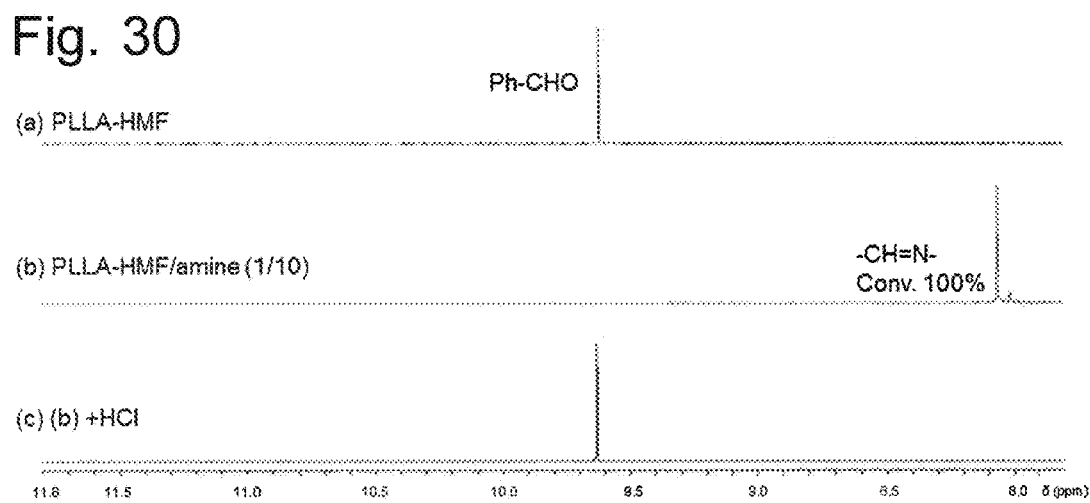
FIG. 30 is a set of ¹H NMR spectra showing the reversibility of the reaction between the aldehyde group at a terminal of the polylactide derivative (PLLA-HMF) according to Production Example 3 in the third embodiment and the primary amine.

Subsequently, the HMF-polylactide (PLLA-HMF(3)) was mixed with 2-(2-aminoethoxy) ethanol so that the ratio of the aldehyde group of the HMF at the terminal and the amino group would be 1:10. After 24 hours, 1 mL of 5-mol/L hydrochloric acid (HCl) was added to the obtained mixture, which was subsequently extracted with chloroform and water three times. After the organic phase was removed by an evaporator, deuterated chloroform (CDCl$_3$) was added to the mixture and a structural analysis ($^1$H NMR) was performed. FIG. 30 shows the result. Spectra (a) and (b) in FIG. 30 are $^1$H NMR spectra at "0 h" and "24 h" in FIG. 29, while spectrum (c) in FIG. 30 is the $^1$H NMR spectrum of the mixture with hydrochloric acid added after the passage of 24 hours. A comparison of spectra (a)-(c) in FIG. 30 shows that the imine peak observed in (b) disappeared after the addition of the hydrochloric acid, and the aldehyde peak emerged. This fact suggested that the reaction between the HMF-polylactide and 2-(2-aminoethoxy) ethanol is reversible, as expressed by the following reaction formula.

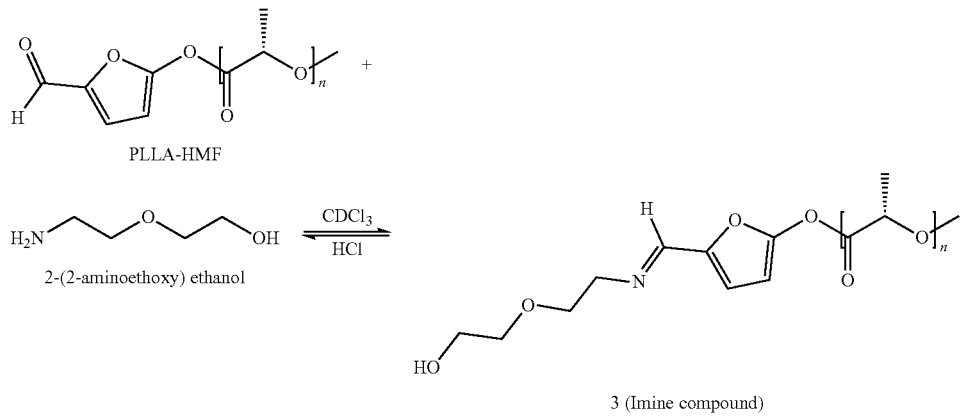

Fourth Embodiment: Polylactide Stereocomplex

<1. Production Method of Polylactide Stereocomplex and Results of Thermal Analyses>

The vanillin-poly-D-polylactide obtained in Production Example 1 of the first embodiment, and the vanillin-poly-L-polylactide obtained in Production Example 2 of the first embodiment, were each dissolved in acetonitrile at a concentration of 5 mg/mL. Then, the two solutions were mixed at room temperature and heated in a static state for 24 hours. Subsequently, the insoluble part, which was the stereocomplex, was collected and subjected to thermal analyses. FIGS. 31-34 show the results.

Figure 31:
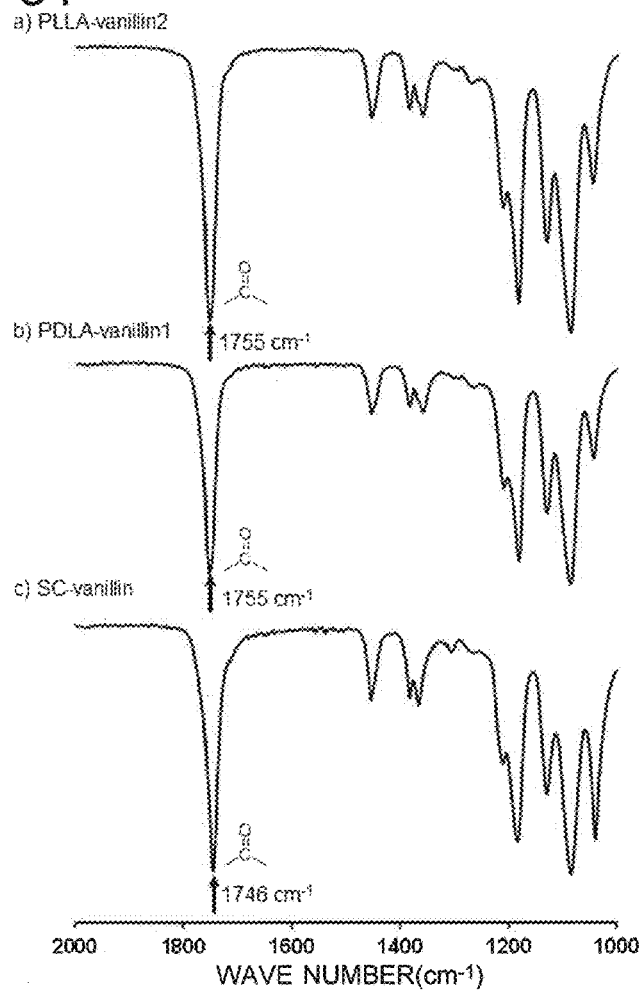
FIG. 31 is a diagram showing the result of an FT-IR analysis for Production Examples 1 and 2 in the first embodiment as well as a stereocomplex obtained by mixing Production Examples 1 and 2.
Figure 32:
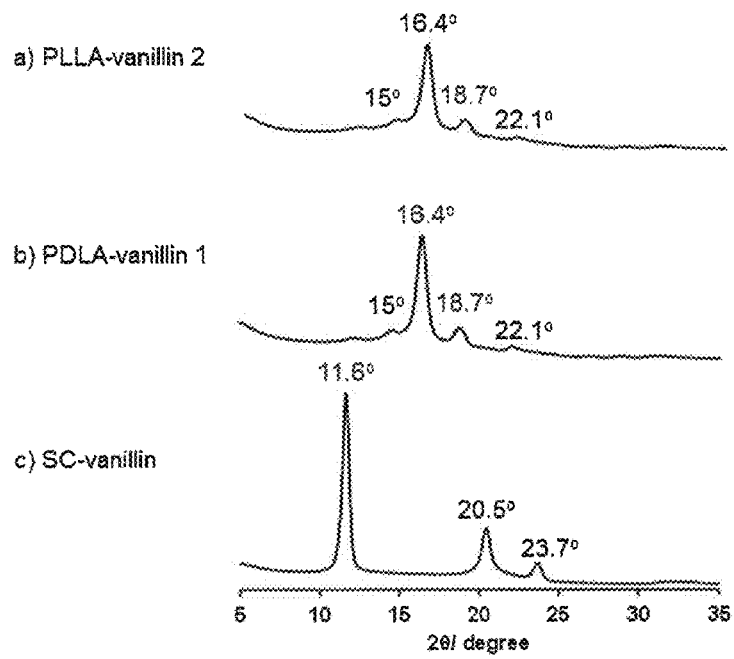
FIG. 32 is a diagram showing the result of an XRD analysis for Production Examples 1 and 2 as well as the stereocomplex obtained by mixing Production Examples 1 and 2.
Figure 33:
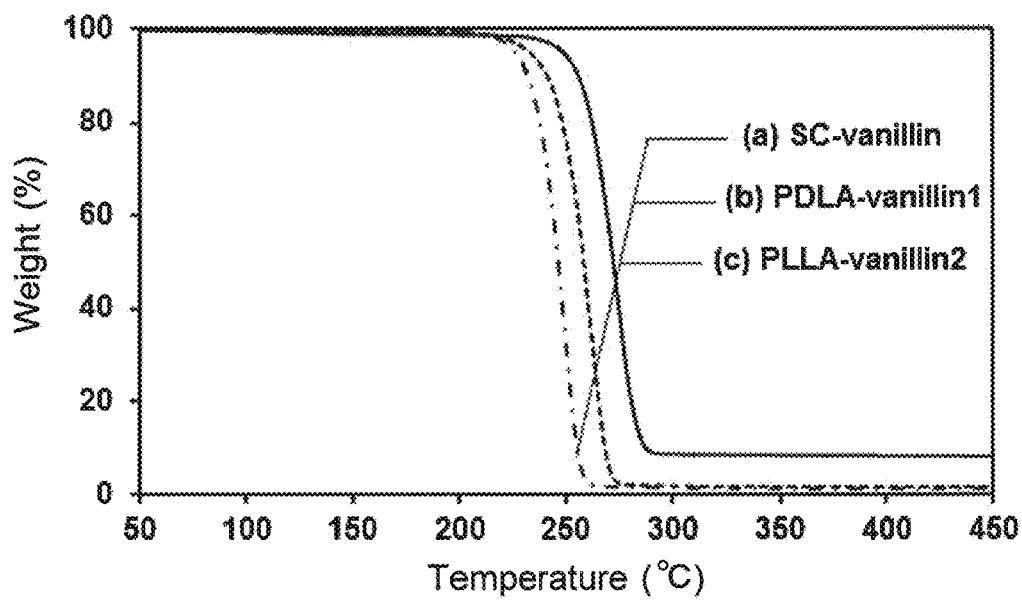
FIG. 33 is a diagram showing the result of a thermal degradation measurement (TGA_thermogravimetric analysis) for Production Examples 1 and 2 as well as the stereocomplex obtained by mixing Production Examples 1 and 2.
Figure 34:
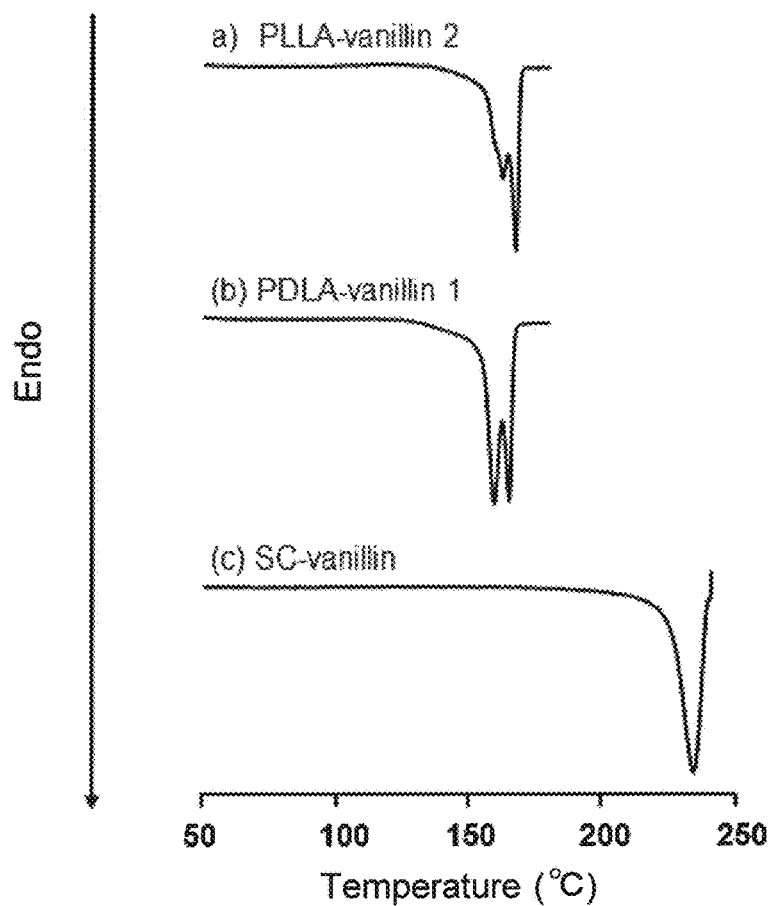
FIG. 34 is a diagram showing the result of a differential scanning calorimetric measurement (DSC) for Production Examples 1 and 2 as well as the stereocomplex obtained by mixing Production Examples 1 and 2.

Specifically, spectra (a)-(c) in FIG. 31 show the results of a Fourier transform infrared spectrometric analysis (FT-IR) of the vanillin-poly-D-lactic acid in Production Example 1, vanillin-poly-L-lactic acid in Production Example 2, and insoluble part (vanillin-polylactide stereocomplex, which may be hereinafter called "vanillin-polylactide SC"). The graphs (a)-(c) in FIG. 32 show the results of an X-ray structural analysis (XRD) of the vanillin-poly-D-lactic acid in Production Example 1, vanillin-poly-L-lactic acid in Production Example 2, and vanillin-polylactide SC. FIG. 33 shows the results of a thermogravimetric analysis (TGA) of the vanillin-poly-D-lactic acid in Production Example 1, vanillin-poly-L-lactic acid in Production Example 2, and vanillin-polylactide SC. The graphs (a)-(c) in FIG. 34 show the results of a differential scanning calorimetric measurement (DSC) of the vanillin-poly-D-lactic acid in Production Example 1, vanillin-poly-L-lactic acid in Production Example 2, and vanillin-polylactide SC.

The results shown in FIGS. 31-34 demonstrated that the vanillin-polylactide SC had a higher melting point and higher pyrolysis temperature than the vanillin-poly-D-lactic acid in Production Example 1 and the vanillin-poly-L-lactic acid in Production Example 2. Such a result (performance improvement) is a commonly known phenomenon which accompanies the stereocomplexation of polylactides. Thus, it was proved that the introduction of vanillin at a terminal of the polylactide does not hamper the performance improvement by the stereocomplexation.

In particular, in the XRD graph for the vanillin-polylactide SC in FIG. 32, strong peaks were observed at 2θ=11.6°, 20.5° and 23.7°, while no peak was observed at 2θ=15°, 16.4°, 18.7° and 22.1° which originate from the monocrystal of vanillin-poly-D-lactic acid or vanillin-poly-L-lactic acid. This fact confirmed that the vanillin-polylactide SC had a stereocomplex structure.

From FIG. 33, the T10 values of the vanillin-poly-L-lactic acid and vanillin-poly-D-lactic acid were around 232° C. and 241° C., respectively, while that of their stereocomplex (vanillin-polylactide SC) was around 256° C. and roughly 20° C. higher than the value of the vanillin-poly-L-lactic acid. This result suggested that the T10 value of the polylactide increased due to the stereocomplexation.

Furthermore, the results of the DSC shown in FIG. 34 demonstrated that the melting points (Tm) of the vanillin-poly-L-lactic acid and vanillin-poly-D-lactic acid in Production Examples 1 and 2 were both around 156° C., while that of the vanillin-polylactide SC was around 235° C. and achieved an increase of 79° C. or even greater.

Medical devices are normally heated to nearly 200° C. for sterilization or disinfection. As noted earlier, the vanillin-polylactide SC has a melting point equal to or higher than 200° C., and therefore, is useful as a high-molecular material that is highly heat-resistant and can withstand the sterilization or disinfection treatment. Another reason for the usefulness of the vanillin-polylactide SC as a biomedical material is that the substance is highly safe since the vanillin introduced at the terminal of the polylactide forming the polylactide SC is a plant-based substance.

<2. Production Method of Another Polylactide Stereocomplex and Results of Thermal Analyses>

The PLLA-HMF obtained in Production Example 3 of the third embodiment, and the PDLA-HMF obtained in Production Example 4 of the third embodiment, were each dissolved in acetonitrile at a concentration of 5 mg/mL. Then, the two solutions were mixed at room temperature and heated in a static state for 24 hours. Subsequently, the insoluble part, which was the stereocomplex, was collected and subjected to thermal analyses. FIGS. 35-38 show the results.

Figure 35:
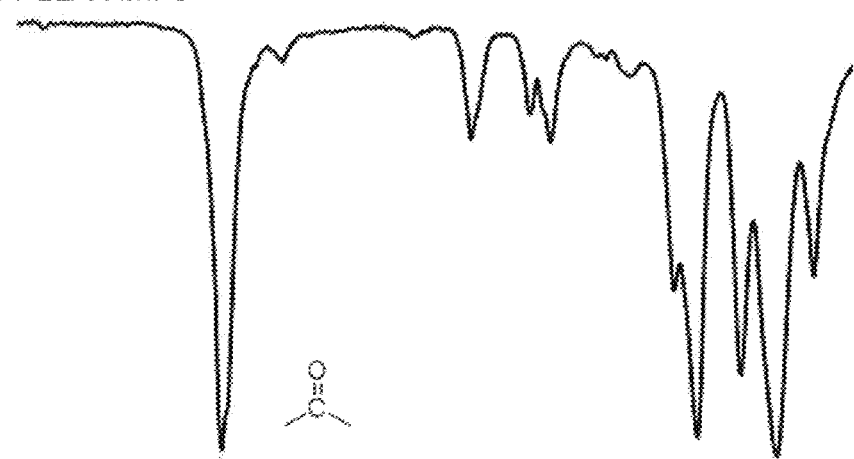
FIG. 35 is a diagram showing the result of an FT-IR analysis for Production Examples 3 and 4 in the third embodiment as well as a stereocomplex obtained by mixing Production Examples 3 and 4.
Figure 35:
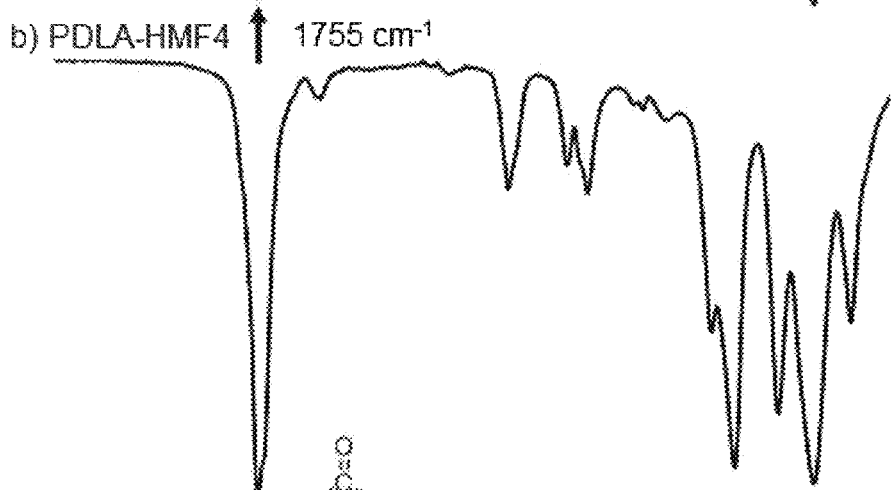
Figure 35:
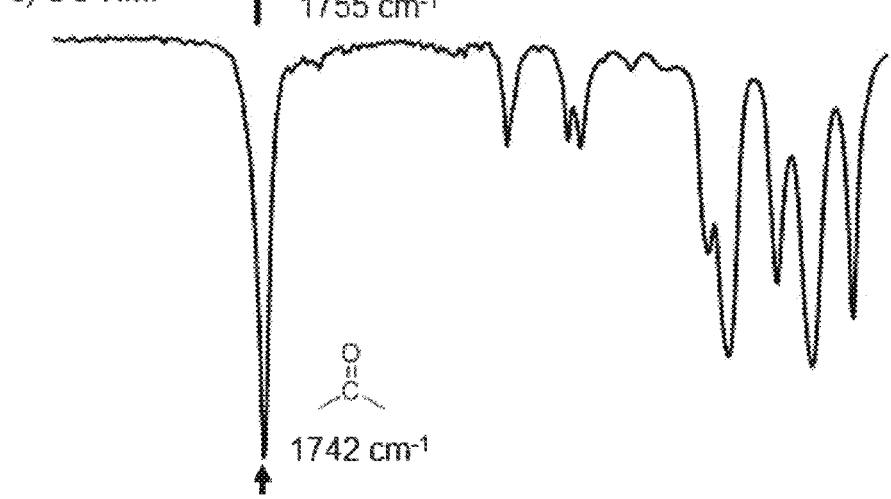
Figure 36:
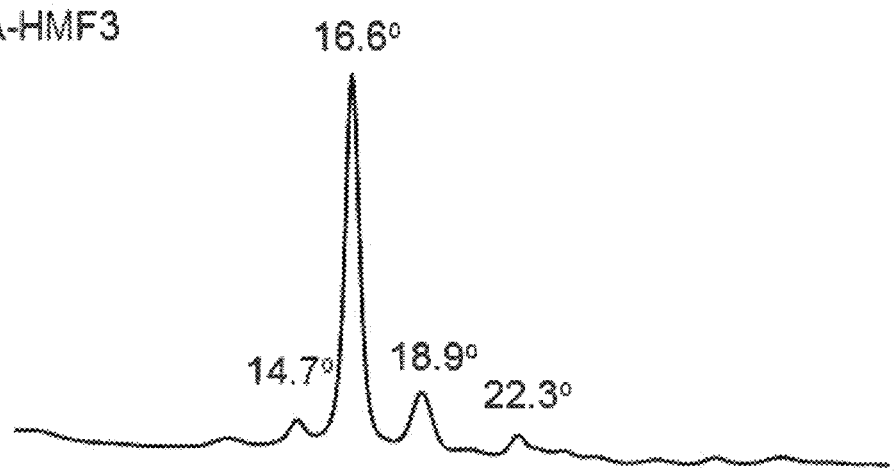
FIG. 36 is a diagram showing the result of an XRD analysis for Production Examples 3 and 4 as well as the stereocomplex obtained by mixing Production Examples 3 and 4.
Figure 36:
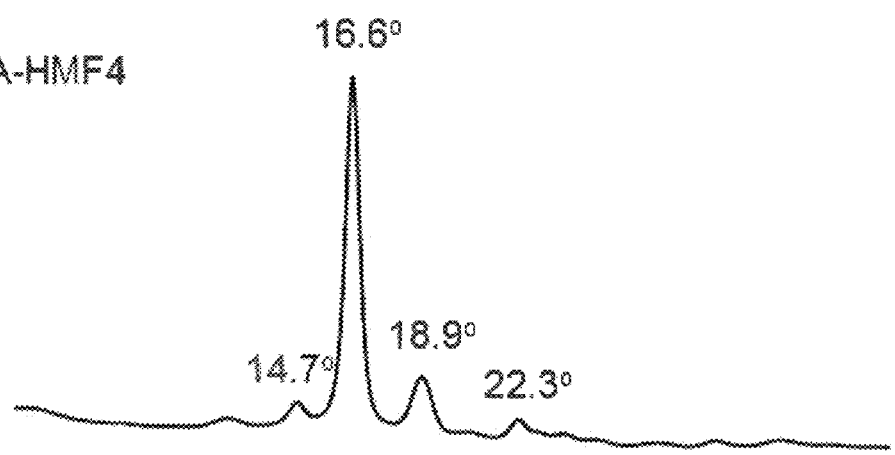
Figure 36:
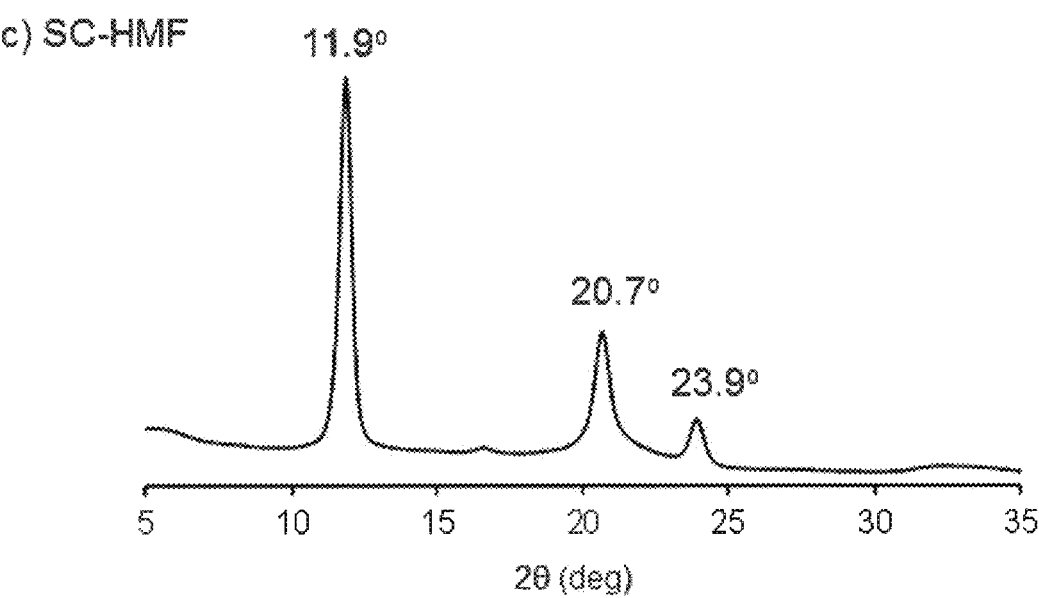
Figure 37:
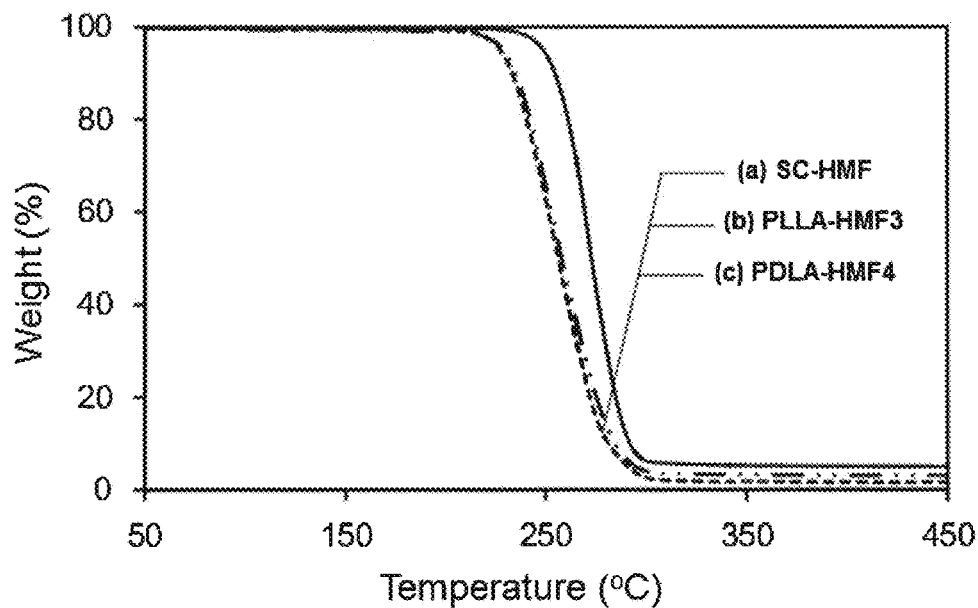
FIG. 37 is a diagram showing the result of a thermogravimetric analysis (TGA) for Production Examples 3 and 4 as well as the stereocomplex obtained by mixing Production Examples 3 and 4.

Specifically, spectra (a)-(c) in FIG. 35 show the results of a Fourier transform infrared spectrometric analysis (FT-IR) of the PLLA-HMF in Production Example 3, PDLA-HMF in Production Example 4, and insoluble part (HMF-polylactide stereocomplex, which may be hereinafter be called "HMF-polylactide SC"). The graphs (a)-(c) in FIG. 36 show the results of an X-ray structural analysis (XRD) of the PLLA-HMF in Production Example 3, PDLA-HMF in Production Example 4, and HMF-polylactide SC. FIG. 37 shows the results of a thermogravimetric analysis (TGA) of the PLLA-HMF in Production Example 3, PDLA-HMF in Production Example 4, and HMF-polylactide SC. The graphs (a)-(c) in FIG. 38 show the results of a differential scanning calorimetric measurement (DSC) of the PLLA-HMF in Production Example 3, PDLA-HMF in Production Example 4, and HMF-polylactide SC.

In the XRD graph for the HMF-polylactide SC in FIG. 36, strong peaks were observed at 2θ=11.9°, 20.7° and 23.9°, while no peak was observed at 2θ=14.7°, 16.6°, 18.9° and 22.3° which originate from the single crystal of the PLLA-HMF or PDLA-HMF. This confirmed that the HMF-polylactide SC had a stereocomplex structure.

From FIG. 37, the T10 values of the PLLA-HMF and PDLA-HMF were around 234° C. and 231° C., respectively, while that of their stereocomplex (HMF-polylactide SC) was around 255° C. This result suggested that the T10 value of the polylactide increased due to the stereocomplexation.

Figure 38:
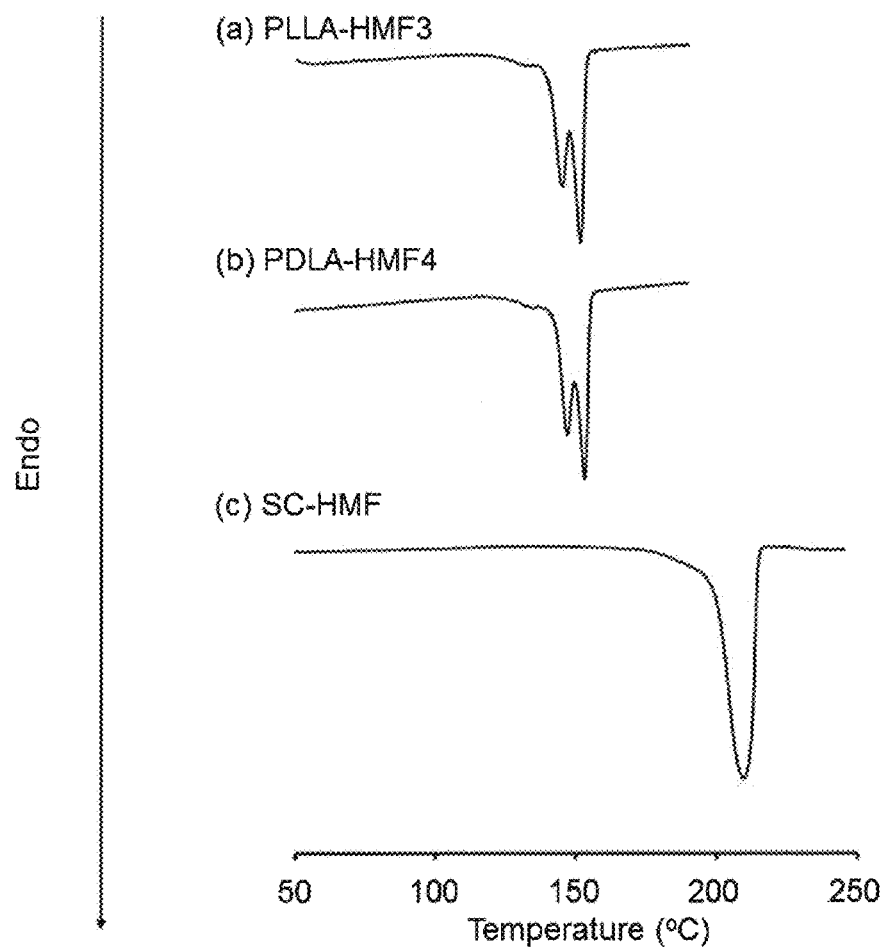
FIG. 38 is a diagram showing the result of a differential scanning calorimetric measurement (DSC) for Production Examples 3 and 4 as well as the stereocomplex obtained by mixing Production Examples 3 and 4.

Furthermore, the results of the DSC shown in FIG. 38 demonstrated that the melting points (Tm) of the PLLA-HMF and PDLA-HMF were approximately 140° C. and 143° C., respectively, while that of the HMF-polylactide SC was approximately 210° C. and achieved an increase of approximately 70° C.

The results shown in FIGS. 35-38 demonstrated that the HMF-polylactide SC had a higher melting point and higher pyrolysis temperature than PLLA-HMF in Production Example 3 and PDLAHMF in Production Example 4 in the third embodiment. Thus, as in the case of vanillin, it was proved that the introduction of HMF at a terminal of the polylactide does not hamper the performance improvement by the stereocomplexation.

The invention claimed is:

1. A polylactic acid derivative expressed by a following general formula (1):

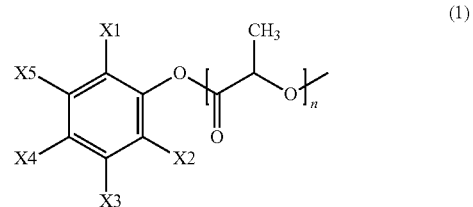

where one of X1-X5 is an aldehyde group, one of the other four is an alkoxy group, and the other three are hydrogen atoms, and wherein n represents the number of lactide repeating units in the polylactic acid derivative.

2. A polylactic acid derivative expressed by a following general formula (2):

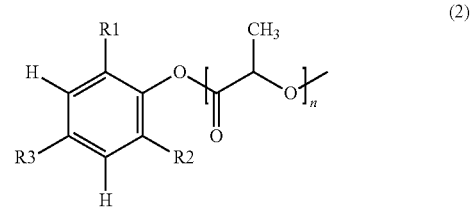

wherein R2 is selected from the group consisting of chlorine atom, fluorine atom, aldehyde group, alkoxy group, alkyl group, ester, and hydrogen atom, wherein R1 is an alkoxy group and R3 is an aldehyde group, and wherein n represents the number of lactide repeating units in the polylactic acid derivative.

3. The polylactic acid derivative according to claim 1, expressed by a following formula (3):

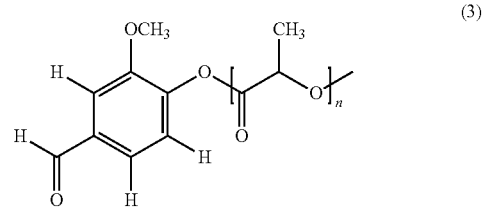

wherein n represents the number of lactide repeating units in the polylactic acid derivative.

4. A polylactic-acid-based stereocomplex containing L- and D-enantiomers of the polylactic acid derivative according to claim 1.

5. The polylactic-acid-based stereocomplex according to claim 4 containing the L- and D-enantiomers of the polylactic acid derivative at a ratio of 1:1.

6. A polylactic-acid-based stereocomplex containing a poly-D-lactic acid derivative expressed by a following formula (5) and a poly-L-lactic acid derivative expressed by a following formula (6) at a ratio of 1:1:

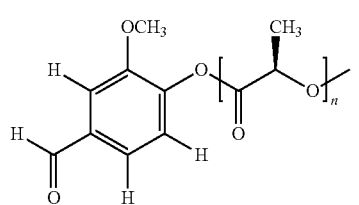

(5)

wherein n represents the number of lactide repeating units in the polylactic acid derivative,

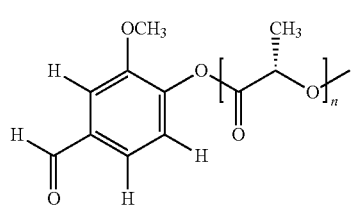

(6)

wherein n represents the number of lactide repeating units in the polylactic acid derivative.

7. A method for producing a polylactic acid derivative according to claim 1, wherein the polylactic acid derivative is produced by a ring-opening polymerization of lactide as a monomer, using a compound expressed by a following general formula (7) as an initiator:

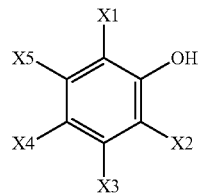

(7)

where one of X1-X5 is an aldehyde group, one of the other four is an alkoxy group, and the other three are hydrogen atoms.

8. A method for producing a polylactic acid derivative according to claim 5, wherein the polylactic acid derivative is produced by a ring-opening polymerization of lactide, using a compound expressed by a following general formula (9) as an initiator:

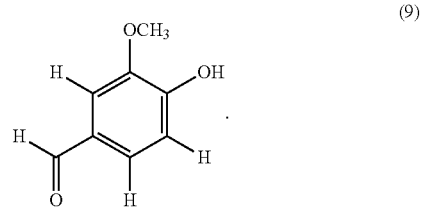

(9)

9. The method for producing a polylactic acid derivative according to claim 7, wherein the polylactic acid derivative is produced by polymerizing the lactide and the compound as the initiator at a molar ratio within a range from 20:1 to 10:1.

10. A method for producing a polylactic acid derivative, wherein a polylactic acid derivative expressed by a following general formula (12) is produced by adding hydrochloric acid to a compound expressed by a following general formula (11):

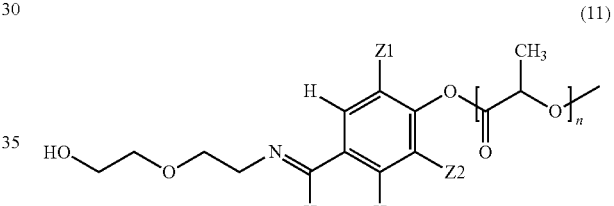

(11)

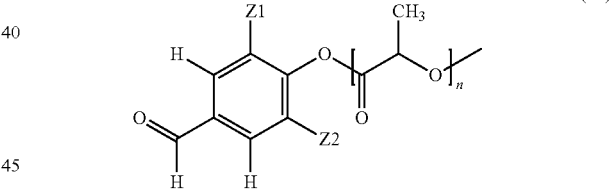

(12)

where one of Z1 and Z2 in formulae (11) and (12) is an alkoxy group and the other is either an alkoxy group or a hydrogen atom, and wherein n represents the number of lactide repeating units in the polylactic acid derivative.

11. The method for producing a polylactic acid derivative according to claim 8, wherein the polylactic acid derivative is produced by polymerizing the lactide and the compound as the initiator at a molar ratio within a range from 20:1 to 10:1.

* * * * *